United States Patent [19]

Yamakawa

[11] Patent Number: 5,565,993
[45] Date of Patent: Oct. 15, 1996

[54] IMAGE PROCESSING APPARATUS FOR FLEXIBLY CHANGING IMAGE DATA USING A SELECTIVE ADDRESSING SCHEME ON A MEMORY STORING THE IMAGE DATA

[75] Inventor: Shinji Yamakawa, Kawasaki, Japan

[73] Assignee: Ricoh Company, Ltd., Tokyo, Japan

[21] Appl. No.: 59,286

[22] Filed: May 11, 1993

[30] Foreign Application Priority Data

May 12, 1992 [JP] Japan ..................................... 4-119154

[51] Int. Cl.$^6$ .............................. H04N 1/00; H04N 1/387
[52] U.S. Cl. ........................... 358/296; 358/444; 358/448
[58] Field of Search .......................... 358/296, 403–405, 358/443, 444, 447–449, 451–453, 464, 471, 474, 488; 382/173, 176, 178, 181, 203, 254, 276, 282, 289, 290, 295, 296, 305, 309, 310

[56] References Cited

FOREIGN PATENT DOCUMENTS

| 62-110362 | 5/1987 | Japan | H04N 1/387 |
| 62-215165 | 9/1988 | Japan | H04N 1/387 |
| 3-12823 | 1/1991 | Japan | G11B 5/845 |
| 3-93352 | 4/1991 | Japan | H04N 1/387 |

*Primary Examiner*—Peter S. Wong
*Assistant Examiner*—Eric Frahm
*Attorney, Agent, or Firm*—Lowe, Price, LeBlanc & Becker

[57] ABSTRACT

In an image processing apparatus, an image reading unit reads an original for each line in a main scanning direction and outputs image data of the original. A memory unit stores the image data, the memory unit having a storage capacity equal to at least one line in the main scanning direction. A control unit generates a write address and a read address of the storage unit so that the image data is written into a storage area specified by the write address and is read from a storage area specified by the read address. An output unit drives an output image from the image data read from the memory unit. A data erasing unit controls either the read address or the write address of the memory unit generated by the control unit so that unnecessary image data which is not required to be output is erased before the unnecessary image data is written into or read from the memory unit.

7 Claims, 36 Drawing Sheets

FIG. II
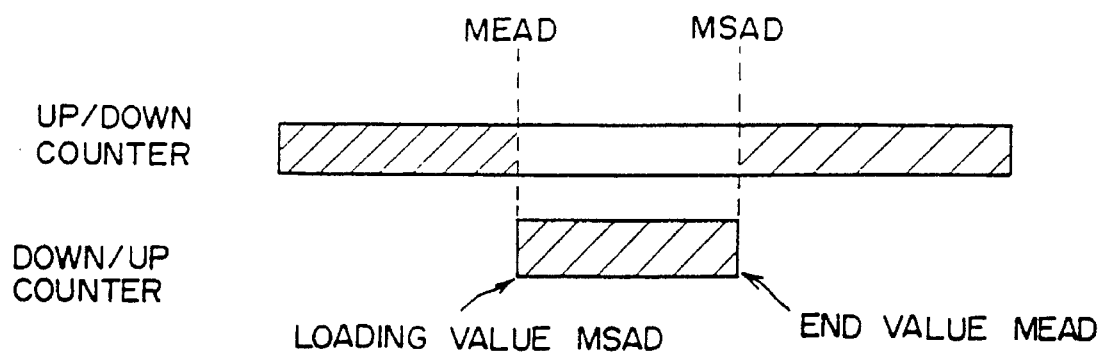
FIG. 12
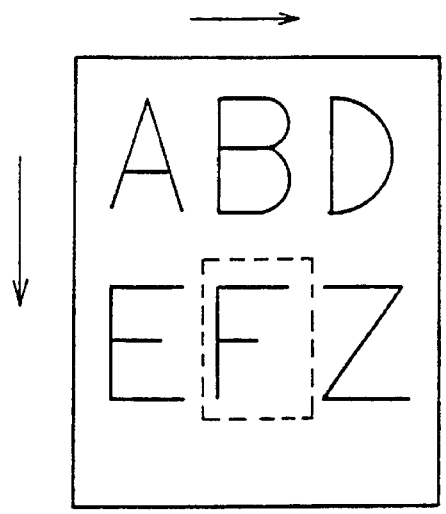
FIG. 13
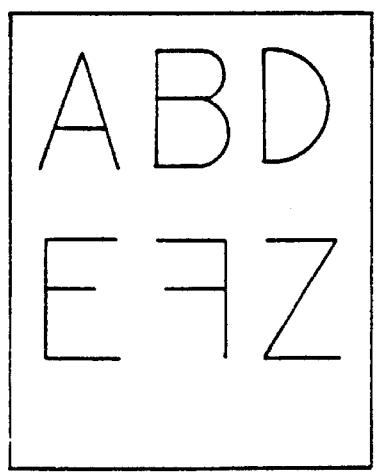

F I G. 32
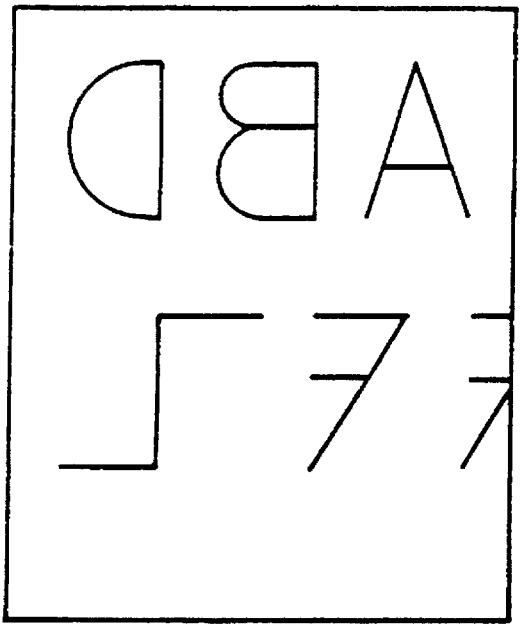
F I G. 33
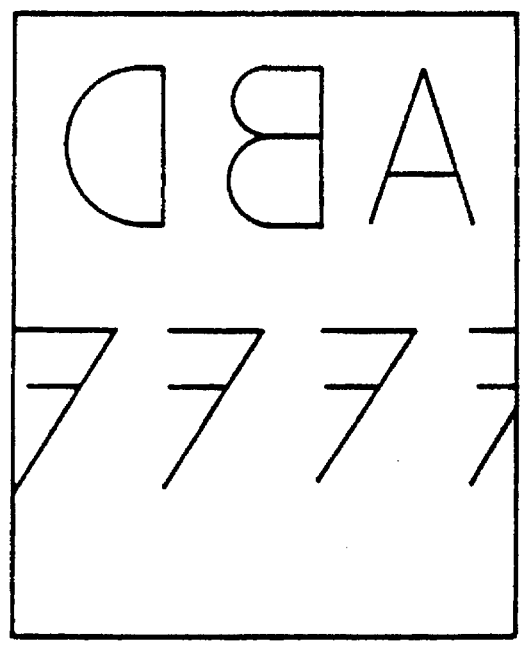

1

IMAGE PROCESSING APPARATUS FOR FLEXIBLY CHANGING IMAGE DATA USING A SELECTIVE ADDRESSING SCHEME ON A MEMORY STORING THE IMAGE DATA

BACKGROUND OF THE INVENTION

The present invention generally relates to an image processing apparatus suitably applicable to a digital copying machine, and more particularly to an image processing apparatus capable of moving an original image obtained by scanning the original or changing the shape of the original image.

Japanese Laid-Open Patent Application No. 63-215165 discloses a technique in which a mirror image output starting point corresponds to a turning point of an image repeat counter (at which the counting operation is switched to the reverse direction).

Japanese Patent Publication No. 2-49073 discloses a technique concerning a local-area mirror having two storage means respectively used for normal images and mirror images.

Japanese Laid-Open Patent Application No. 3- 12823 discloses that both write and read addresses are used to erase unnecessary information.

Japanese Laid-Open Patent Application No. 3- 93352 relates to a local-area slant process in which a character image is converted into local-area data and normal data. Then master data is derived from the local-area data and the normal data.

However, the prior art disclosed in Japanese Laid-Open Patent Application No. 63-215165 has a disadvantage in that an image cannot be repeatedly arranged at equal intervals within the full line range through there is nothing which discloses or suggests that an image is repeatedly output a designated number of times. For example, a part of a repeated image may still be missing.

Japanese Patent Publication No. 2-49073 has a disadvantage in which there is nothing which discloses or suggests a timing offset between image data indicating a slant character and normal image data.

Japanese Laid-Open Patent Application No. 3- 12823 has a disadvantage in which both the read and write addresses must be controlled in order to erase unnecessary image data.

Japanese Laid-Open Patent Application No. 3- 93352 has a disadvantage in there is nothing which discloses or suggests a timing offset between image data indicating a slant character and normal image data.

SUMMARY OF THE INVENTION

It is a general object of the present invention to provide an image processing apparatus in which the above disadvantages are eliminated.

A more specific object of the present invention is to provide an image processing apparatus capable of easily outputting image outputs in various modes.

These objects of the present invention is achieved by an image processing apparatus comprising:

image reading means for reading an original and for outputting image data of the original;

storage means, coupled to the image reading means, for storing the image data, the storage means having a storage capacity equal to at least one line in a main scanning direction;

control means, coupled to the storage means, for generating a write address and a read address of the storage means so that the image data is written into a storage area specified by the write address and is read from a storage area specified by the read address;

output means, coupled to sad read means, for driving an output image from the image data read from the storage means; and data erasing means, coupled to the storage means, for controlling either the read address or the write address of the storage means generated by the control means so that unnecessary image data which is not required to be output is erased before the unnecessary image data is written into or read from the storage means.

BRIEF DESCRIPTION OF THE DRAWINGS

Other objects, features and advantages of the present invention will become more apparent from the following detailed description when read in conjunction with the accompanying drawings, in which:

FIG. 11 is a diagram illustrating a read address used in the structure shown in FIG. 8;

FIG. 12 is a diagram illustrating an original to be scanned;

FIG. 13 is a diagram illustrating an image output obtained by image processing (local mirror) in the embodiment of the present invention;

FIG. 32 is a diagram illustrating an image output obtained by image processing (image repeat & total area slant & total area mirror) in the embodiment of the present invention;

FIG. 33 is a diagram illustrating an image output obtained by image processing (image repeat & total area slant & total area mirror) in the embodiment of the present invention;

DESCRIPTION OF THE PREFERRED EMBODIMENTS

Figure 1:
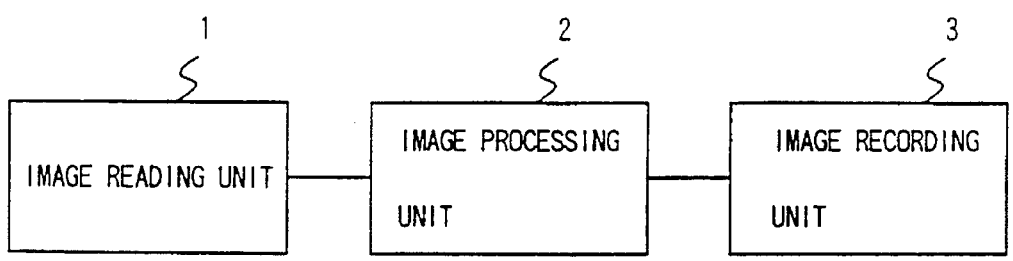
FIG. 1 is a block diagram of an overview of an image forming apparatus according to the present invention.

FIG. 1 shows an image processing apparatus according to an embodiment of the present invention. The image processing apparatus is made up of an image reading unit 1, an image processing unit 2, and an image recording unit 3. The image reading unit 1 scans an original and outputs digital image data directly or after it is stored in an internal memory. The image processing unit 2 carries out a predetermined process for the digital image data. The image recording unit 3 records image data obtained by the predetermined process on paper. In addition to the above printing function or instead thereof, the image recording unit 3 stores the image data from the image processing unit 2.

Figure 2:
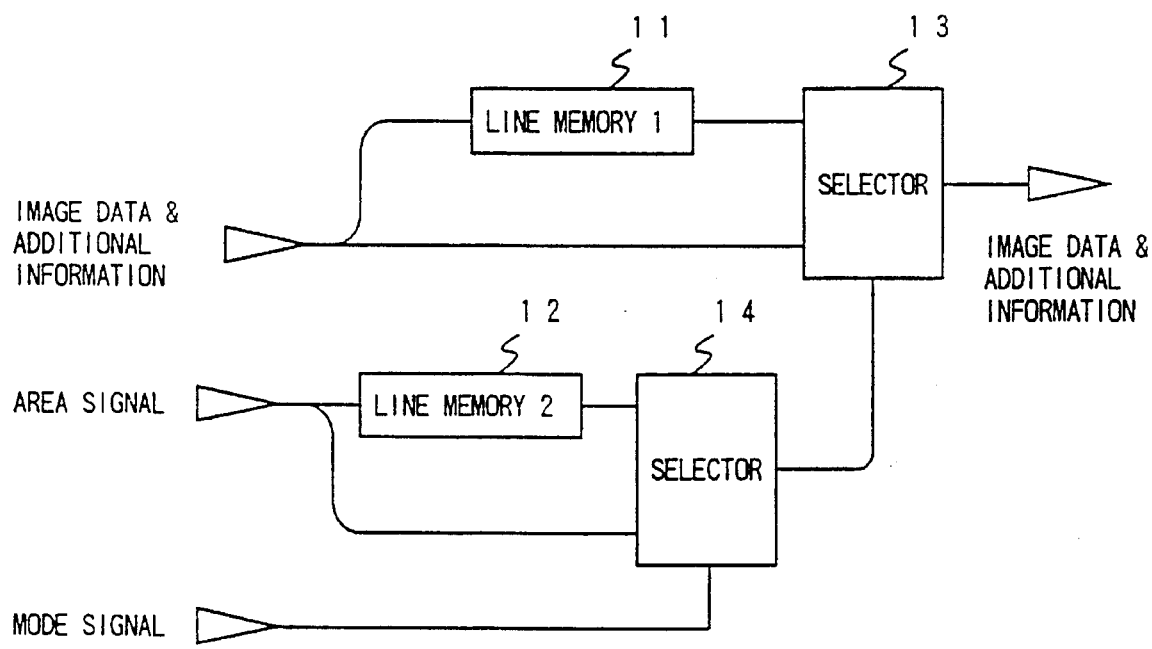
FIG. 2 is a block diagram of a structure in which image data and additional information are selectively output on the basis of an area signal and a mode signal.

FIG. 2 is a block diagram of a unit for selecting either image data or additional information on the basis of an area signal. The unit shown in FIG. 2 is made up of line memories 11 and 12, and selectors 13 and 14. Image data or additional information is applied to the line memory 11 and the selector 13. The area signal is applied to the line memory 12 and the selector 14, which selects either the area signal directly received or the area signal from the line memory 12 in accordance with a mode signal. The selected signal from the selector 14 is used for controlling the selector 13, which selects either the signal directly received or the signal from the line memory 11 in accordance with the output signal of the selector 14.

Figure 3:
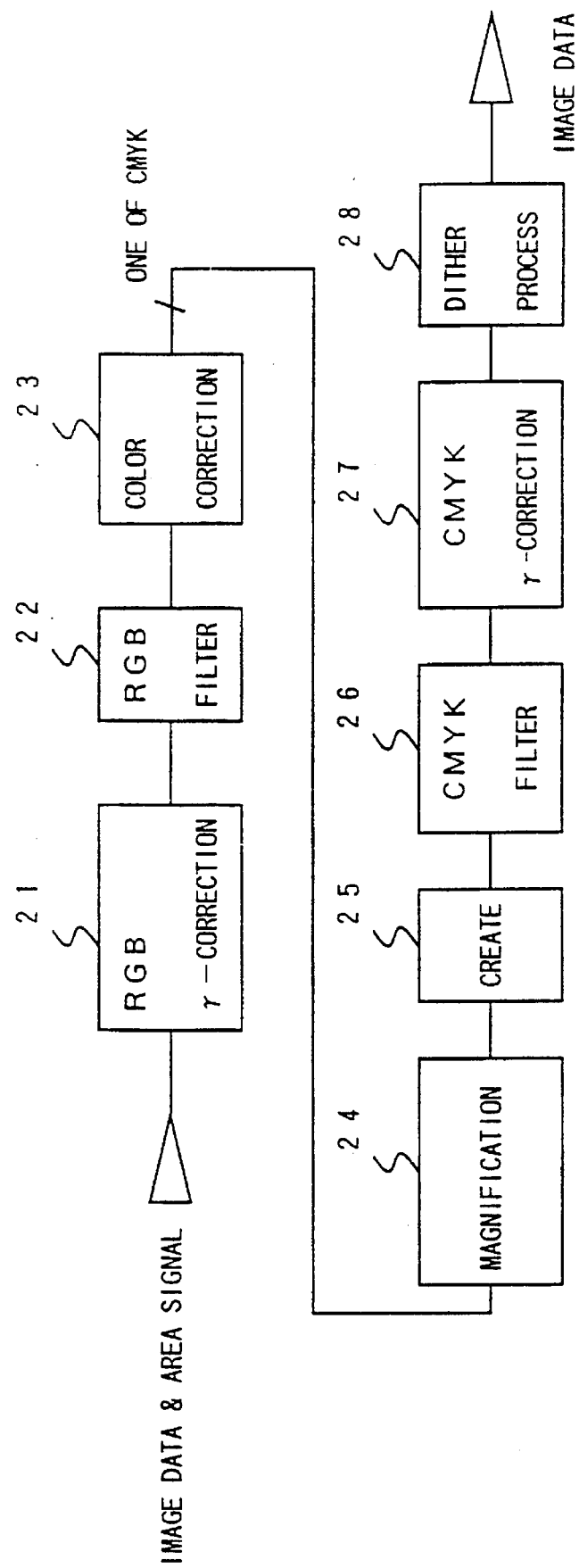
FIG. 3 is a block diagram of an image processing unit shown in FIG. 2.

FIG. 3 is a block diagram of the image processing unit 2 shown in FIG. 1. The image processing unit 2 shown in FIG. 3 is made up of an RGB-gamma correction unit 21, an RGB filter 22, a color converting unit 23, a modification change unit 24, a creating unit 25, a CMYK filter 26, a CMYK gamma-correction unit 27, and a Dither processing unit 28.

The RGB-gamma correction unit 21 performs a gamma-correction operation on R (red), G (green) and B (blue) data of the signal from the image reading unit 1. The RGB filter 22 performs an edge emphasizing process or a smoothing process for each of the R, G and B data. The color converting unit 23 converts the R, G and B data into C (cyanogen), M (magenta), Y (yellow) and K (black) in accordance with a masking equation. The magnification change unit 24 changes the magnification in a main scanning direction. The magnification in a sub-scanning direction can be changed in the image reading unit 1. The creating unit 25 performs a process for mirroring, slanting, shading, mosaic assembly or the like. The CMYK filter 26 performs an edge emphasizing or smoothing process for an arbitrary one of the C, M, Y and K data. The CMYK gamma-correction performs a gamma correction suitable for the gamma characteristic of image recording. The Dither processing unit 28 performs a halftone process for converting the C, M, Y and K into C', M', Y' and K' (where the number of bits is such that C>C', M>M', Y>Y' and K>K').

In the following description, the R, G and B data are received and an arbitrary one of the Y, M, C and K is created by the color correction and is then output to the image recording unit 3. That is, the Y, M, C and K are obtained by scanning the original four times.

The area signal is generated by an area signal generating unit (not shown), which is cascaded to the blocks of the image processing unit 2. That is, the blocks of the image processing unit 2 are synchronized with each other in order to prevent the image data and the area signal from being out of phase, and each of the blocks receives the image data and the area signal synchronized with each other. The area signal is used to switch image processing modes. For example, mode #0 indicates a normal process, mode #1 indicates a repeat process, mode #2 indicates a mirror process, and mode #3 a slanting process. It is possible to arbitrarily define the image processing modes.

Figure 4:
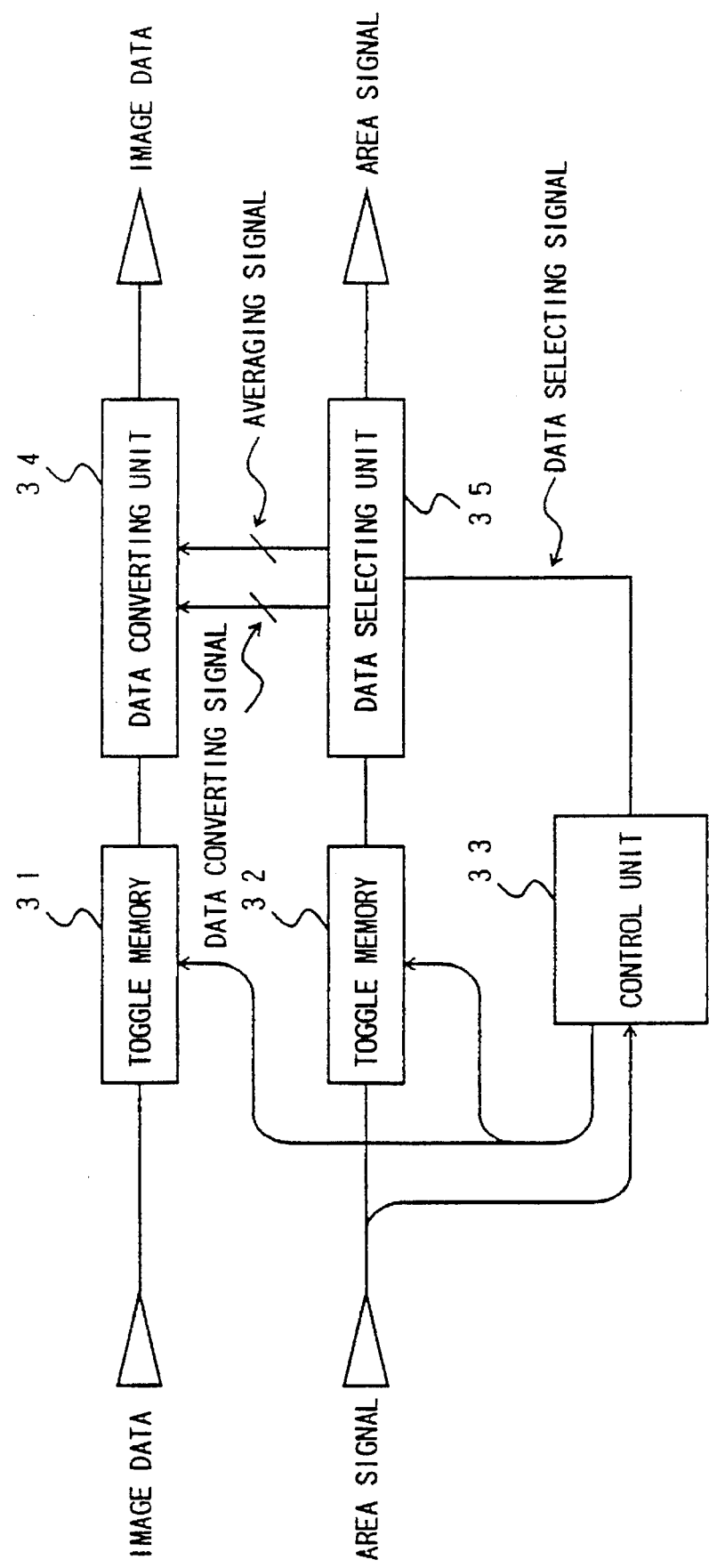
FIG. 4 is a block diagram of a creating unit shown in FIG. 3.
Figure 5:
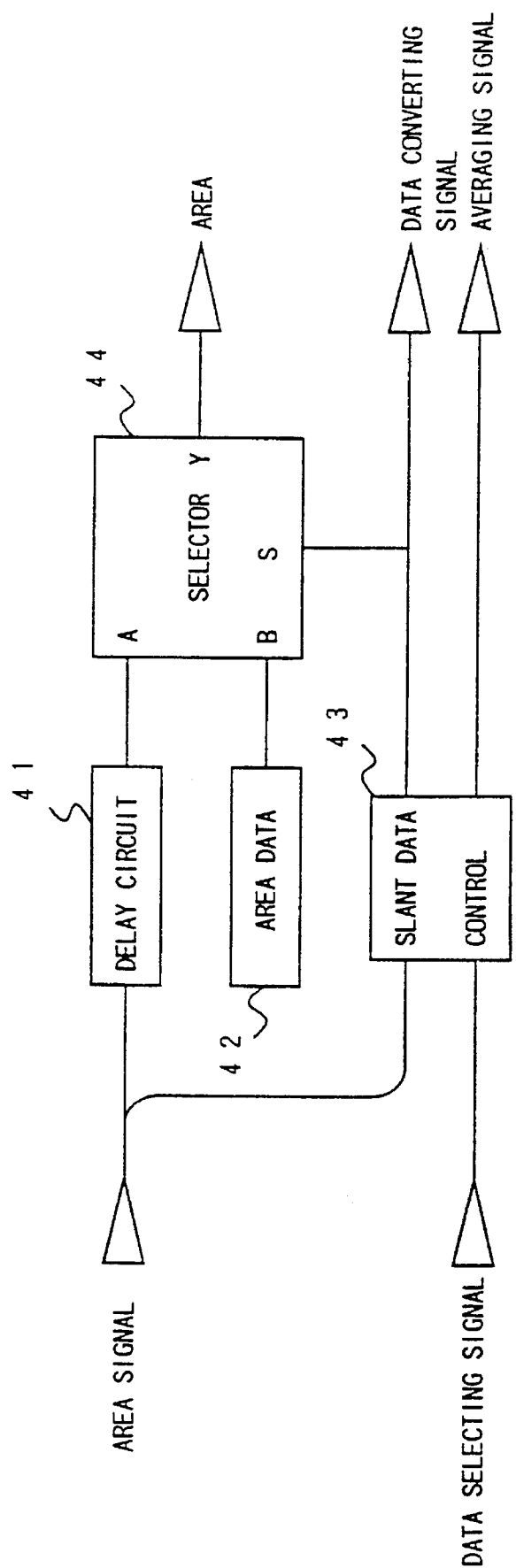
FIG. 5 is a block diagram of a data selecting unit shown in FIG. 4.
Figure 6:
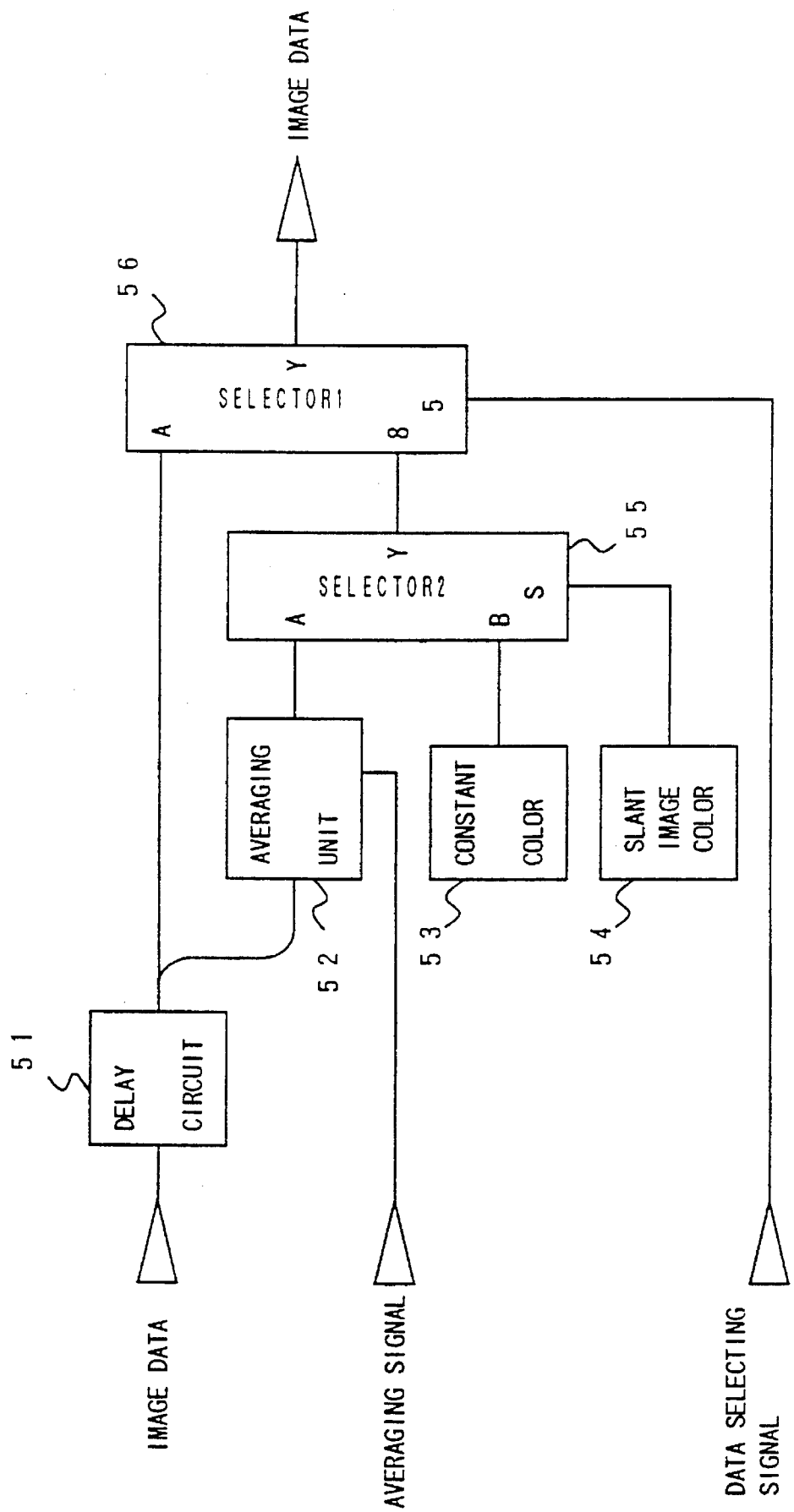
FIG. 6 is a block diagram of a data converting unit shown in FIG. 4.
Figure 7:
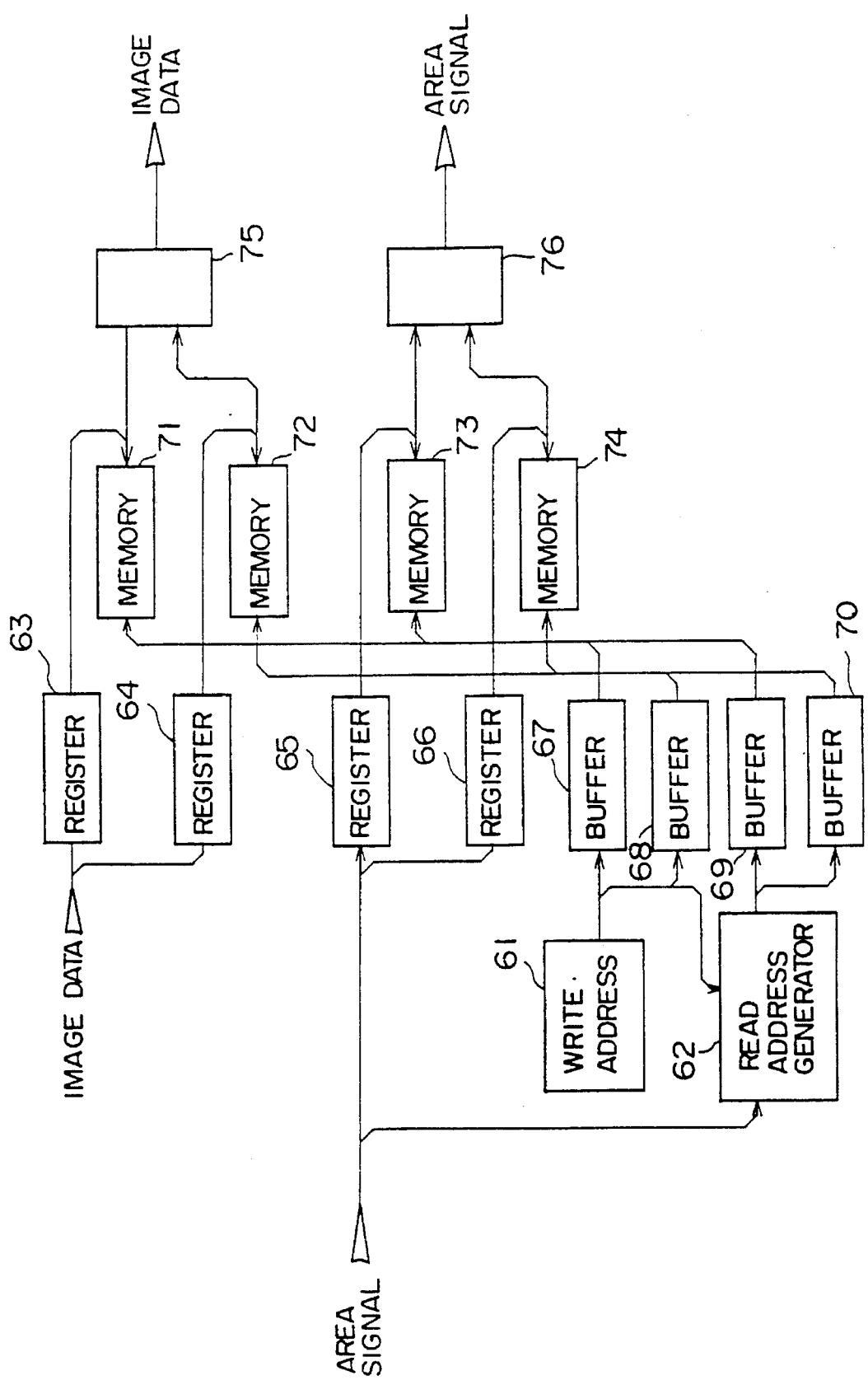
FIG. 7 is a block diagram illustrating a basic control structure of a toggle memory unit provided in the creating unit.
Figure 8:
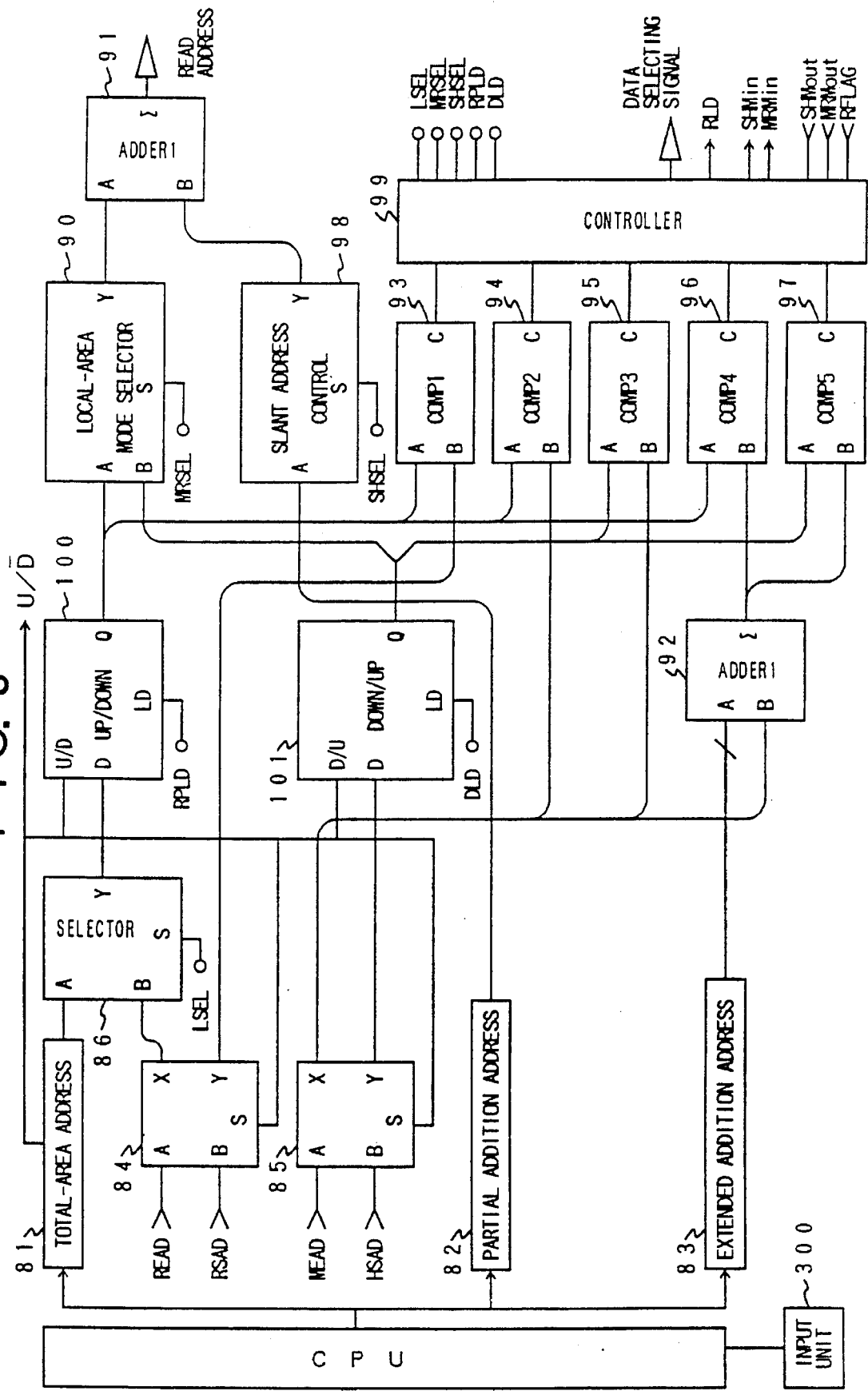
FIGS. 8 through 10 are block diagrams illustrating the structure of the toggle memories and the control unit in more detail.
Figure 9:
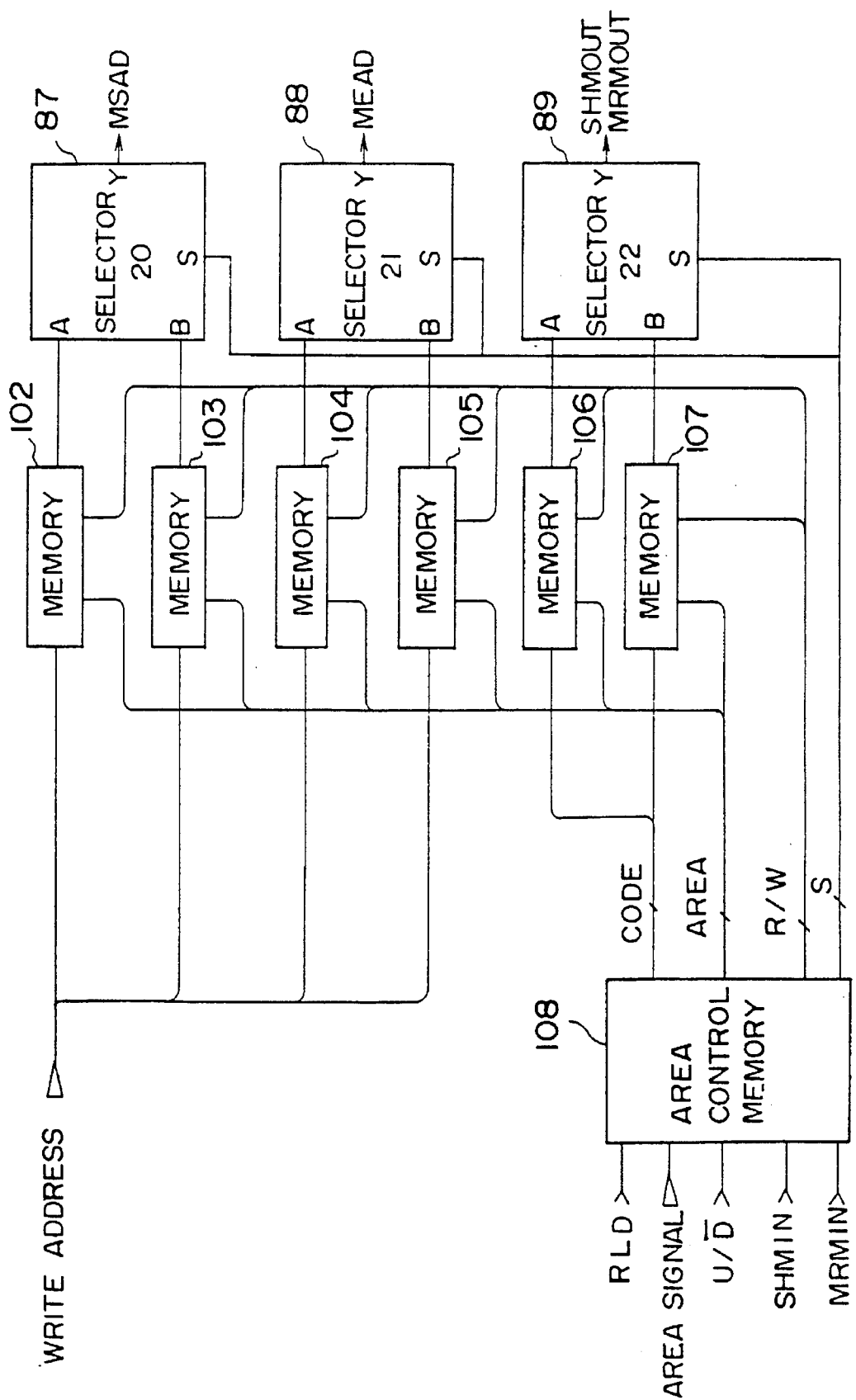
Figure 10:
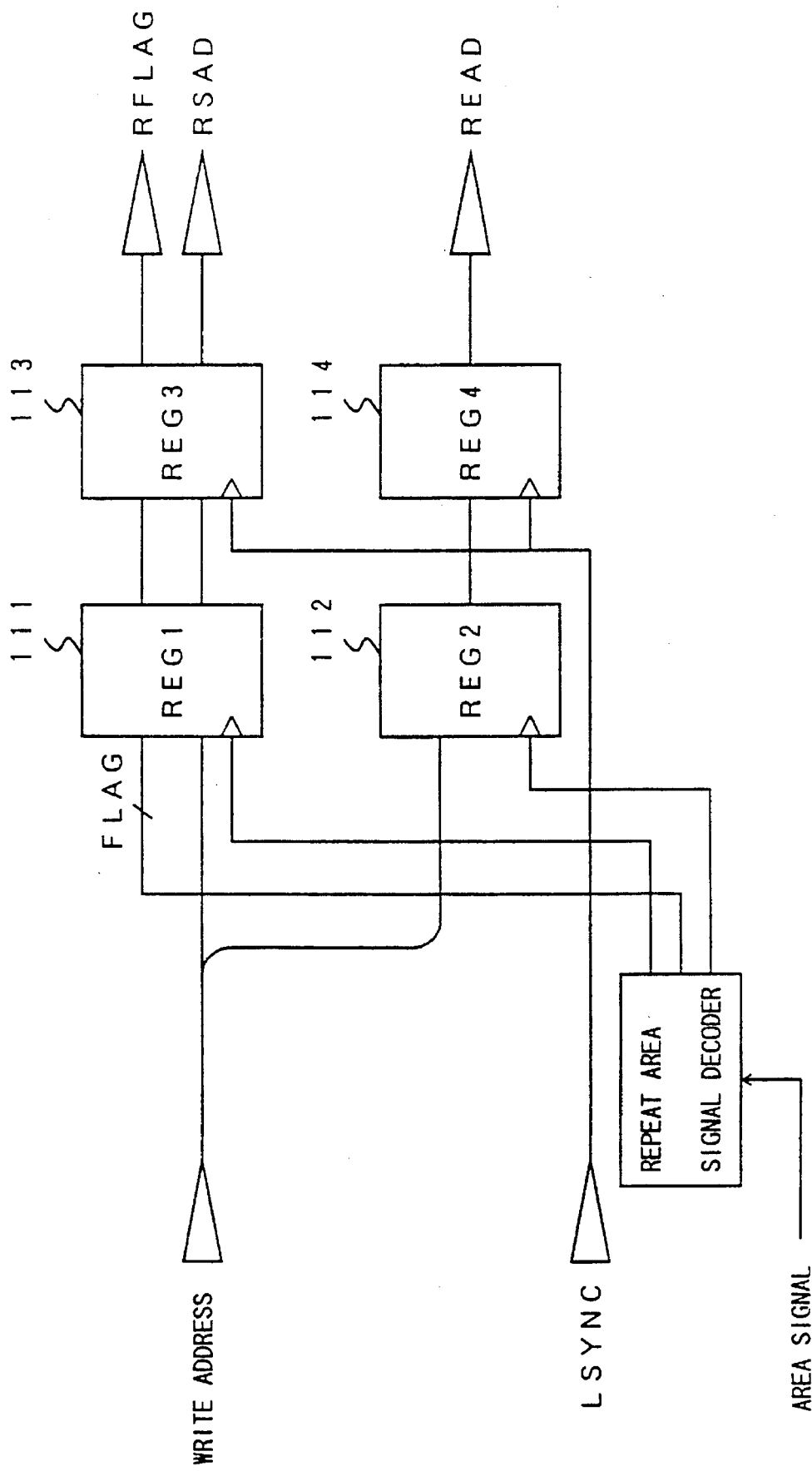

A description will now be given, with reference to FIGS. 4 through 10, of the details of the creating unit 25 which is one of the essential parts of the present invention. FIG. 4 is a block diagram of the overall structure of the creating unit 25, and FIG. 5 is a block diagram of a data selecting unit shown in FIG. 4. FIG. 6 is a block diagram of a data converting unit shown in FIG. 4. FIG. 7 is a block diagram illustrating the basic structure of a control unit and toggle memories shown in FIG. 4. FIGS. 8 through 10 are block diagrams illustrating the structure of the toggle memories and the control unit in more detail.

Referring to FIG. 4, the creating unit 25 is made up of toggle memories 31 and 32, a control unit 33, a data converting unit 34, and a data selecting unit 35. Under the control of the control unit 33, the toggle memory 31 stores the image data, and the toggle memory 32 stores the area signal.

Referring to FIG. 5, the data selecting unit 35 is made up of a delay circuit 41, an area data register 42, a slant body data control unit 43, and a selector 44.

Referring to FIG. 6, the data converting unit 34 is made up of a delay circuit 51, an averaging unit 52, a fixed color data register 53, a slant body color mode register 54, a selector 55 and a selector 56.

Referring to FIG. 7, each of the toggle memories 31 and 32 is made up of a write address counter 61, a read address counter 62, registers 63–66, buffers 67–70, memories 71–74, and selectors 75 and 76.

Referring to FIGS. 8 through 10, there are provided a total area register 81, a partial addition address register 82, and an extended addition address register 83. Address data held in these registers can be rewritten every line or every few lines under the control of a CPU to which an input unit 300 is connected. The input unit 300 is used to input various pieces of data and information. The address data stored in the total area address register 81 is used to control address shifting for scanning the full page. Further the register 81 outputs an up/down instruction U/D-bar (hereinafter D-bar is written as <D>). The address data stored in the partial addition address register 82 is used to increase or decrease the quantity of address shifting for scanning the full page.

The CPU shown in FIG. 8 control the overall operation of the embodiment. For the sake of simplicity, the CPU is illustrated so as to be connected to only the registers 81, 82 and 83. For example, a sensor signal from a sensor provided in the vicinity of the original is received by the CPU, which outputs the corresponding line synchronizing signal LSYNC.

A switch unit 84 receives write address signals READ and RSAD (which will be described later) via input terminals A and B. When the level of a control terminal S is logically low (L), the switch unit 84 outputs the write address signals READ and RSAD via output terminals X and Y, respectively. When the level of the control signal S is logically high (H), the switch unit 84 outputs the write address signals READ and RSAD via the output terminals Y and X, respectively. A switch unit 85 receives signals MEAD and MSAD via input terminals A and B. When the level of a control terminal S is low (L), the switch unit 84 outputs the signals MEAD and RSAD via output terminals X and Y, respectively. When the level of the control signal S is high (H), the switch unit 84 outputs the signals RSAD and MEAD via the output terminals Y and X, respectively.

Referring to FIG. 9, a selector 87 has an input terminal A connected to a memory 102, and an input terminal B connected to a memory 103. When the level of a select terminal S of the selector 87 is low, a signal received via the input terminal A is output via an output terminal Y. When the level of the select terminal S is high, a signal received via the input terminal B is output via the output terminal. A selector 88 has an input terminal A connected to a memory 104, and an input terminal B connected to a memory 105. The selector 88 operates in the same manner as the selector 87. A selector 89 has an input terminal A connected to a memory 106, and an input terminal B connected to a memory 107. The selector 89 operates in the same manner as the selector 87.

A local-area mode selector 90 shown in FIG. 8 has two input terminals A and B, an output terminal Y and a select terminal S. When the level of the select terminal S is low, a signal applied to the input terminal A is output via the output terminal Y. When the level of the select terminal S is high, a signal applied to the input terminal B is output via the output terminal Y.

An adder 91 shown in FIG. 8 performs an addition operation on inputs A and B, and outputs A+B via its output terminal Σ. An adder 92 operates in the same manner as the adder 91. Each of comparators 93, 94, 95, 96 and 97 shown in FIG. 8 has input terminals A and B and an output terminal C. When A=B, a low-level signal is output via the output terminal C.

A slant body address controller 98 shown in FIG. 8 has an input terminal A, an output terminal Y and a control terminal S. When the level of the control terminal S is low, zero is output via the output terminal Y. When the level of the control terminal S of the slant body address controller 98 is high, a signal received via the input terminal A is output via the output terminal Y.

A controller 99 shown in FIG. 8 is connected to the comparators 93–97. The structure and function of the controller 99 will be described in detail later. An up/down counter 100 has a control terminal U/D, a data terminal D, an output terminal Q and a loading terminal LD. When the level of the control terminal U/D is high, the up/down counter 100 performs up-counting. When the level of the control terminal U/D is low, the up/down counter 100 performs down-counting. The up/down counter 100 operates in synchronism with a clock signal (a pixel synchronizing signal). An up/down counter 100 has a control terminal U/D, a data terminal D, an output terminal Q and a loading terminal LD. When the level of the control terminal U/D is high, the down/up counter 101 performs down-counting. When the level of the control terminal U/D is low, the up/down counter 100 performs up-counting. The down/up counter 101 operates in synchronism with the pixel synchronizing signal.

The memories 102 through 107 shown in FIG. 9 temporarily store information indicating a variation point in a local-area slant mode or a mirror mode. An area memory controller 108 decodes a signal generated by means of an area signal generator realized by the CPU shown in FIG. 8. In the embodiment being considered, the following modes are used [mode #0: normal (total area) mode, mode #1: repeat (local area) mode, mode #2: mirror (local area) mode, mode #3: slant (local area) mode, mode #4: repeat & mirror (local area) mode, mode #5: repeat & slant (local area) mode, mode #6: mirror (local area) & slant (local area) mode.

The up/down instruction signal U/<D> from the total area address register 81 is applied to the area memory controller 108. When the up/down instruction signal U/<D> is high and the area signal from the CPU indicates either the mirror mode or the slant mode, the area memory controller 108 writes a write address and a process code into areas of the memories 102 and 106 respectively assigned predetermined area numbers (process (1)). The process code consists of two bits and functions as a mirror or slant starting signal. When the selection of the mirror mode or the slant mode is completed, the area memory controller 108 writes the write address data and the area number into the memory 104 (process (2)). The above process is repeatedly carried out up to the end of a line being considered. The area number is sequentially incremented from zero.

When a line synchronizing signal is generated, the memories 102, 104 and 106 start the read operation (process (3)). When the up/down instruction signal U/<D> is high, the area memory controller 108 outputs area number 0. Then, the write addresses stored in the areas in the memories 102, 104 and 106 corresponding to area number 0 (first area) are read therefrom, and applied to the selectors 87, 88 and 89, respectively. Then, the write addresses read from the memories 102, 104 and 106 are output via the selectors 87, 88 and 89, as signals MSAD (mirror start address), MEAD (mirror end address) and SHMout or MRMout (local-area mirror indication flag). When either a signal SHMin or MRMin supplied from the controller 99 is switched in the order L-H-L, the controller 108 changes the area number from 0 to 1, and the same process as described above is repeatedly performed.

During the above operation, the above-mentioned processes (1) and (2) are carried out with respect to the memories 103, 105 and 107. Then the process (3) is carried out until a loading signal RLD is generated by the controller 99 shown in FIG. 8 or up to the end of a line being considered.

When the loading signal RLD is generated, the area memory controller 108 returns the area number to the initial value 0 of the line being considered. When the line synchronizing signal LSYNC is applied to the area memory controller 108, the operation is repeated from the initial value 0 if the signal U/<D> is high (H). When the signal U/<D> is low (L), the area number is sequentially decremented (down counting) from the area number (for example, 3) stored last, when either the signal SHMin or MRMin is switched in the order L-H-L. When the loading signal RLD is generated by the controller 99, the area memory controller 108 returns the area number to the initial value 3 with respect to the line being considered. In other cases, the operation performed when the signal U/<D> is low is the same as that performed when the signal U/<D> is high. The contents of the memories 102–107 are initialized to zero when the mode is switched from the read mode to the write mode in synchronism with the line synchronizing signal LSYNC.

When the line synchronizing signal LSYNC is generated, the modes of the memories 102, 104 and 106 are switched from the write mode to the read mode or vice versa, and the modes of the memories 103, 105 and 107 are switched from the read mode to the write mode or vice versa (step (4): toggle operation). The area memory controller 108 outputs read/write mode signals R/W to the memories 102–107, and outputs a select signal S to the selectors 87–89. The read/write mode signals applied to the memories 102, 104 and 106 have an identical level, and the read/write mode signals applied to the memories 103, 105 and 107 have an identical level which is the inverted version of the signals applied to the memories 102, 104 and 106. The selectors 87–89 select the input terminals connected to the memories which are operating in the read mode.

Registers 111–114 shown in FIG. 10 are formed of flip-flops used to store the write addresses. A repeat area signal decoder 115 decodes the area signal generated by the area signal generator realized by the CPU shown in FIG. 8. When the repeat mode is specified, the write address is stored in the register 111 under the control of the repeat area signal decoder 115. When the selection of the repeat mode is completed, the write address is stored in the register 112 under the control of the repeat area signal decoder 115. In response to the line synchronizing signal LSYNC, the contents of the registers 111 and 112 are transferred to and held in the registers 113 and 114, respectively. The write address read from the register 113 is output as a signal RSAD, and the write address read from the register 114 is output as a signal READ. The repeat area signal decoder 115 outputs a repeat select flag FLAG, which is stored in the register 111 and then the register 113. The repeat select flag FLAG is read from the register 115 and is output as a signal RFLAG.

A description will now be given of the operation of the embodiment of the present invention. FIG. 12 illustrates an original to be read and a copy of the original produced by image processing in the normal mode. FIGS. 13 through 41 and 44 through 53 illustrate the results of image processing in various modes.

The write address counter 61 is reset to zero (address 0) in response to the line synchronizing signal LSYNC. The count value of the write address counter 61 is incremented each time data is written into the memories 71 and 73 via the registers 63 and 64 or the area signal is written into the memories 72 and 74 via the registers 65 and 66. Data to be written into a storage area specified by address 0 is always set to be 0. Data 0 is written into the memories 71–74 until valid image data is obtained. Only valid image data is written into the memories.

NORMAL PROCESS

The controller 99 shown in FIG. 8 generates a loading signal RPLD synchronized with the line synchronizing signal LSYNC and maintained at the high level, and maintains all the other output signals at the low level. The total area address in the register 81 functions as a load value (for example, 0). The loading signal RPLD is applied to the up/down counter 100. The up/down instruction signal U/<D> applied to the up/down counter 100 is high and thereby the up/down counter 100 functions as an up counter. The total area address is loaded to the up/down counter 100 via the selector 86, and is then output as the read address via the local-area mode selector 90 and the adder 91. The read address is output to the memories 71 and 73 or the memories 72 and 74 via the buffers 69 and 70.

That is, the initial value 0 of the full address stored in the register 81 is loaded to the up/down counter in synchronism with the line synchronizing signal. The read address generated by the up/down counter 100 is set to the initial value 0 and is then sequentially incremented each time data is read from the memories 71 or 73 and the memories 72 and 74, as in the case of the write address counter 61 shown in FIG. 7. That is, image data and the area signal are output with a delay corresponding to one line. The data converting unit 34 and the data selecting unit 35 shown in FIG. 4 allow the image data and the area signal to pass through these units. That is, the input data is output without any change effected thereto, and the creating unit 25 does not create anything. As a result, the original shown in FIG. 12 is output as it is.

MOVEMENT/MIRROR MODE

The operation performed in the movement/mirror mode is different from that in the normal mode in the value of the total area address. A description will now be given of an operation for outputting a mirror output shown in FIG. 49. The initial value of the total area address registered in the total area address 81 is set to an end address of the original. For example, the end address of the original is 3360 when the original is of A4 size and 16 dots are present in a length of 1 mm, and is 4752 when the original is of A3 size and 16 dots are present in a length of 1 mm. The up/down instruction signal U/<D> applied to the up/down counter 100 is set to be low, and hence the up/down counter 100 functions as a down counter.

The memories 71 and 73 and the memories 72 and 74 function as up counters in the data write mode, and function as down counters in the data read mode. That is, the image data is read in a direction reverse of the direction in the data write mode.

Figure 50:
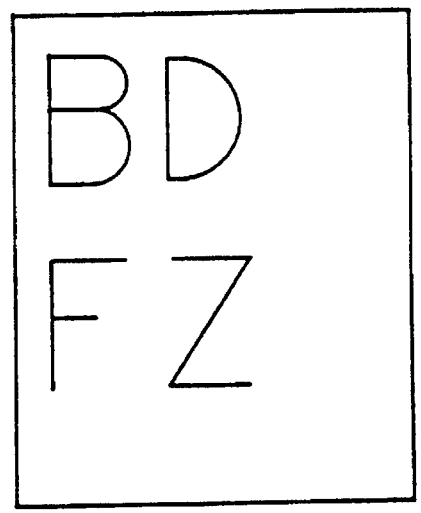
FIG. 50 is a diagram illustrating an image output obtained by image processing (movement) in the embodiment of the present invention.

A description will now be given of the movement mode with reference to FIG. 50. The initial value of the total area address stored in the register 81 is set to a value corresponding to a movement amount. The up/down instruction signal U/<D> applied to the up/down counter 100 is set to be high, and thereby the up/down counter 100 functions as an up counter. In the read mode, the read address is incremented from the initial value thereof stored in the register 81.

Data other than image data should be zero (white). As the movement amount increases, an increased memory capacity must be ensured. In the present embodiment, the whole memory capacity is set equal to the maximum document size. If an address exceeds the maximum document size, such an address is converted into an arbitrary address by means of the buffers 69 and 70 shown in FIG. 7.

In the present embodiment, an address exceeding the maximum document size is converted into address 0. Hence, data 0 corresponding to address 0 is output. That is, it is enough to provide a memory capacity equal to the minimum document size, and ensure only the address on the basis of the movement amount.

Figure 51:
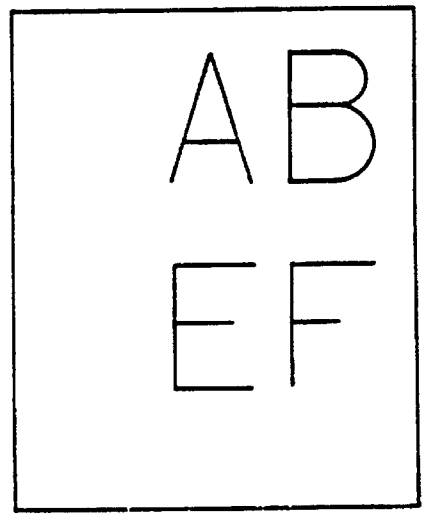
FIG. 51 is a diagram illustrating an image output obtained by image processing (movement) in the embodiment of the present invention.

A description will now be given of an operation for obtaining an image shown in FIG. 51 in the movement mode. The initial value of the total area address stored in the register 81 is set to be a movement amount (a minus value). The up/down instruction signal U/<D> applied to the up/down counter 100 is set to be low in order to make the up/down counter 100 function as an up counter. Minus address values which indicate portions preceding to the leading end of the original are converted into an arbitrary address by means of the buffers 69 and 70.

In the embodiment being considered, the above arbitrary address is address 0. Hence, address 0 is applied to the memories 71 and 73 and the memories 72 and 74 when a minus address value is generated. Plus address values relating to the original are not converted, and thereby image data of the original is output in the normal mode.

SLANT MODE

Figure 52:
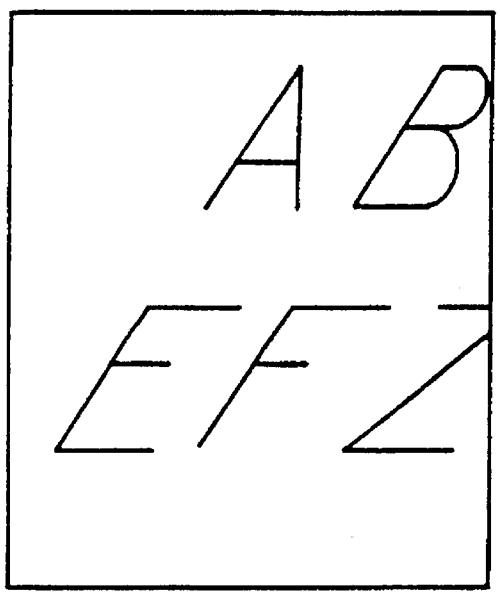
FIG. 52 is a diagram illustrating an image output obtained by image processing (slant) in the embodiment of the present invention.
Figure 53:
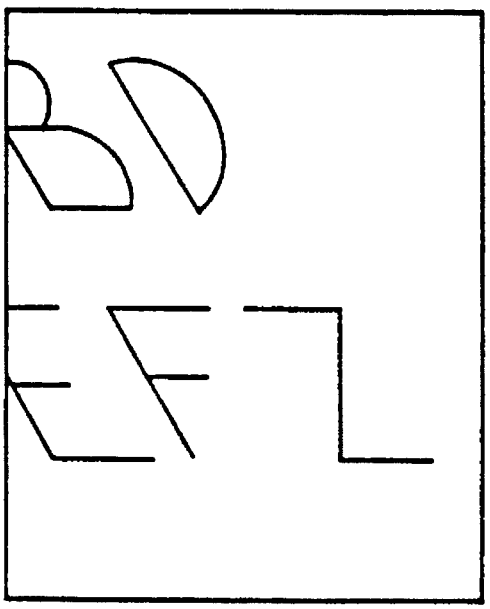
FIG. 53 is a diagram illustrating an image output obtained by image processing (slant) in the embodiment of the present invention.

A description will now be given, with reference to FIGS. 52 and 53, of the slant mode. Slanting of characters is realized by performing movement of images per line unit. The operation performed in the slant mode is different from the operation in the normal, movement, and mirror modes in the value of the total area address stored in the register 81. Further, the operation in the slant mode is different from that in the movement mode in that the address is changed every line or every few lines. The mirror, movement and slat modes can be realized by changing the total area address, and hence combinations of these modes can be made.

REPEAT MODE

The controller 99 shown in FIG. 8 generates the loading signal RPLD when the line synchronizing signal is received, or when the repeat select flag RFLAG read from the register 113 shown in FIG. 10 is valid, and the addresses applied to the comparator 93 are the same as each other. The controller 99 generates a high-level select signal LSEL to be applied to the select terminal S of the selector 86 when the repeat select flag RFLAG is valid, the addresses compared by the comparator 94 are the same as each other, and the synchronizing signal is not generated. In other cases, the controller 99 maintains the select signal LSEL at the low level. Further, the controller 99 maintains the other signals at the low level. The circuit shown in FIG. 10 operates in the same manner as has been described previously.

Figure 15:
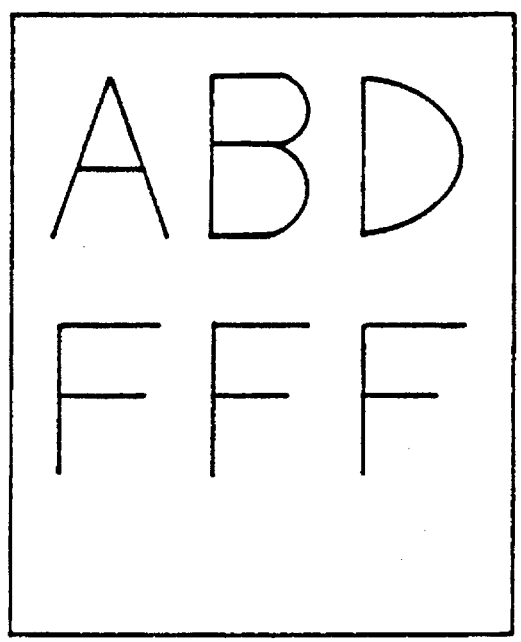
FIG. 15 is a diagram illustrating an image output obtained by image processing (image repeat) in the embodiment of the present invention.

A description will now be given of an operation in which a character F in a designated area illustrated by a broken line shown in FIG. 13 is subjected to the repeat process, and thereby an image output shown in FIG. 15 is generated. The total area address stored in the register 81 is the same as that stored therein in the normal mode. In the sub scanning direction, there is no designated area until the sub scan does not reach the designated area indicated by the broken line, and the operation is carried out in the same way as that in the normal mode. The area signal continues to indicate "1" (repeat) while the designated area is being scanned. While the original area outside of the designated area is being scanned, the area signal indicates "0" (normal processing). When the area signal switches from "0" to "1", the repeat area signal decoder 115 writes a repeat starting address and the high-level repeat select flag RFLAG into the register 111.

When the area signal switches from "1" to "0", the repeat area signal decoder 115 writes a repeat end address in the register 112. In response to the line synchronizing signal LSYNC, the contents of the registers 111 and 113 are transferred to and held in the registers 112 and 114, respectively.

The repeat end address, the repeat starting address and the repeat select flag RFLAG are used for read control with a delay equal to one line. Hence there is no offset between the image data and the area signal with respect to the direction of the line (sub-scanning direction).

Referring to FIG. 8, the controller 99 switches the select signal LSEL to the low level in response to the line synchronizing signal LSYNC, and the total area address is loaded to the up/down counter 100 via the selector 86. At this time, the up/down instruction signal U/<D> applied to the up/down counter 100 is high. In response to the high-level instruction signal U/<D>, the switch unit 84 outputs the repeat starting address signal RSAD and the repeat end address signal READ via the output terminals X and Y, respectively. When the count value of the up/down counter 100 is sequentially incremented and it is determined, at the comparator 93, that the count value thereof becomes equal to the repeat end address READ (the flag RFLAG is valid), the controller 99 switches the select signal LSEL to the high level and outputs the loading signal RPLD to the up/down counter 100.

At this time, the repeat start address RSAD is loaded to the up/down counter 100. The up/down counter 100 performs the up-counting operation again while the instruction signal U/<D> is maintained at the high level. When the addresses compared by the comparator 93 match, the above-mentioned operation is repeatedly carried out. In this manner, the image output shown in FIG. 14 is obtained.

Figure 14:
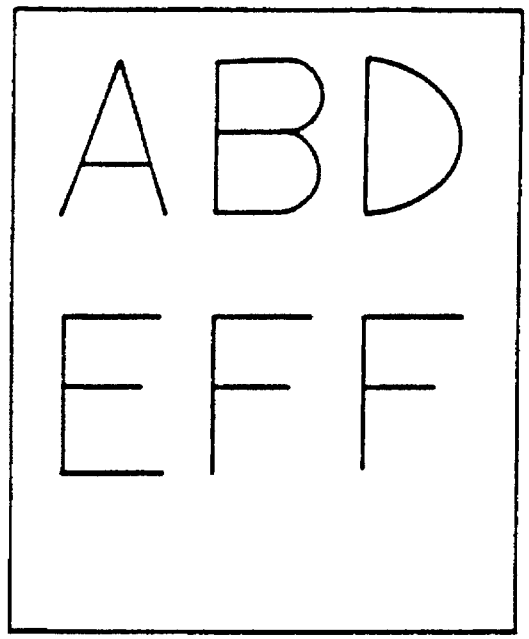
FIG. 14 is a diagram illustrating an image output obtained by image processing (image repeat) in the embodiment of the present invention.

If there is no need to output a character "E" shown in FIG. 14, image data indicating the character "E" can be erased before writing it into the memories or after reading it therefrom. The other operations in the repeat mode are the same as those in the normal mode.

Figure 64:
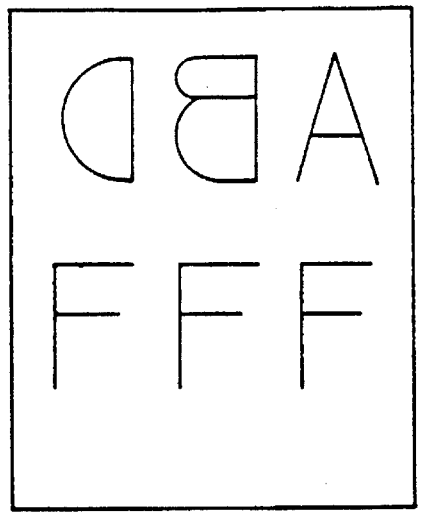
FIG. 64 is a diagram illustrating an image output derived from the original shown in FIG. 58.

When the repeat starting address is stored in the total area address register 81 in the repeat mode, an image output shown in FIG. 15 can be obtained. By changing the total area address, it is possible to arbitrary move images. For example, an image output shown in FIG. 64 can be obtained.

REPEAT & MIRROR MODE

The operation in this mode differs from that in the repeat mode in the total area address stored in the register 81. Referring to FIG. 8, in response to the line synchronizing signal LSYNC, the select signal LSEL is switched to the low level. The total area address is loaded to the up/down counter 100 via the selector 86. The setting of other parameters is the same as that in the mirror mode.

The signal U/<D> is low, and the switch unit 84 outputs the repeat end address READ and the repeat starting address RSAD via the output terminals X and Y, respectively. When the count value of the up/down counter 100 is sequentially decremented and becomes equal to the repeat starting address RSAD at the comparator 93 (flag RFLAG is valid), the controller 99 switches the select signal LSEL to the high level and outputs the loading signal RPLD to the up/down counter 100.

Figure 16:
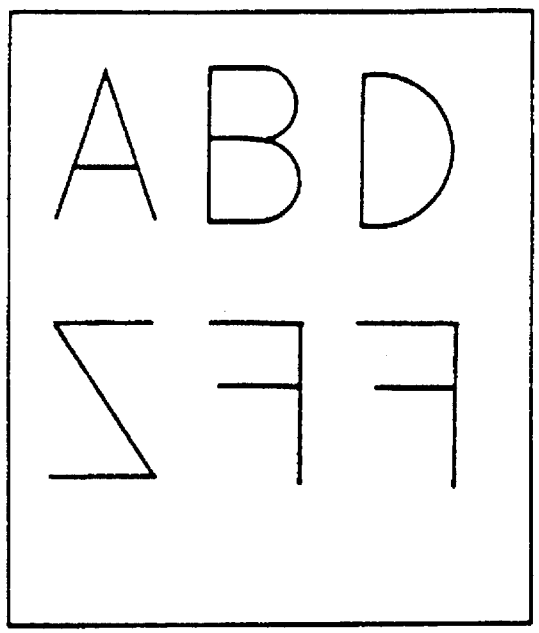
FIG. 16 is a diagram illustrating an image output obtained by image processing (image repeat & mirror) in the embodiment of the present invention.

At this time, the repeat end address READ is loaded to the up/down counter 100. The signal U/<D> is maintained at the low level, and the up/down counter 100 performs the up counting operation again. When the address generated by the up/down counter 100 becomes equal to the repeat end address READ at the comparator 93, the above operation is repeatedly carried out. The operations other than the operation described above are the same as those in the normal mode. In the above manner, an image output shown in FIG. 16 is obtained.

Figure 17:
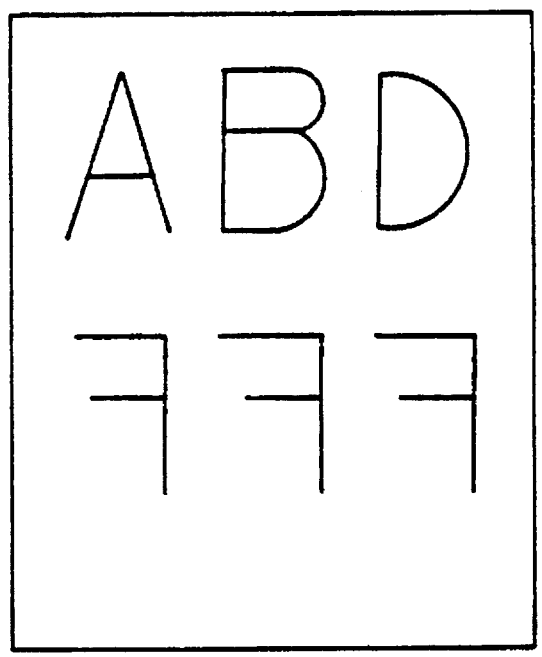
FIG. 17 is a diagram illustrating an image output obtained by image processing (image repeat & mirror) in the embodiment of the present invention.
Figure 18:
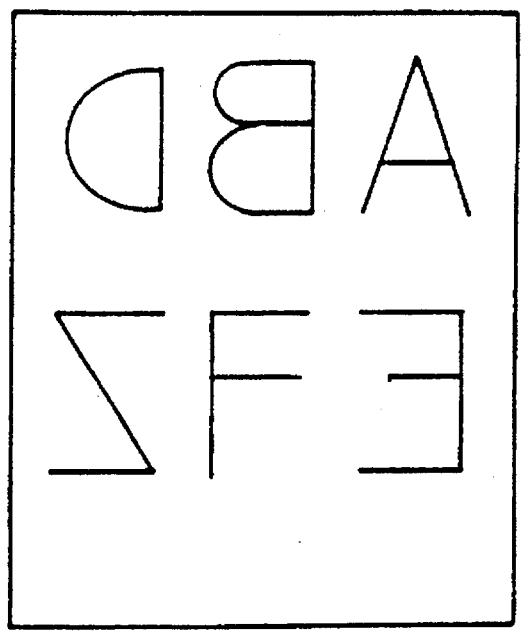
FIG. 18 is a diagram illustrating an image output obtained by image processing (total-area mirror+local-area mirror) in the embodiment of the present invention.

When the repeat end address is set as the total area address stored in the register 81 in the repeating process, an image output shown in FIG. 17 is obtained. By changing the total area address, it is possible to arbitrarily move images.

If there is no need to output a mirror version of a character "Z", image data indicating the mirror version "Z" can be erased before writing it into the memories or after reading it therefrom. If a repeated character exceeds the trailing end of the original, image data indicating it can be erased in the next block.

Figure 19:
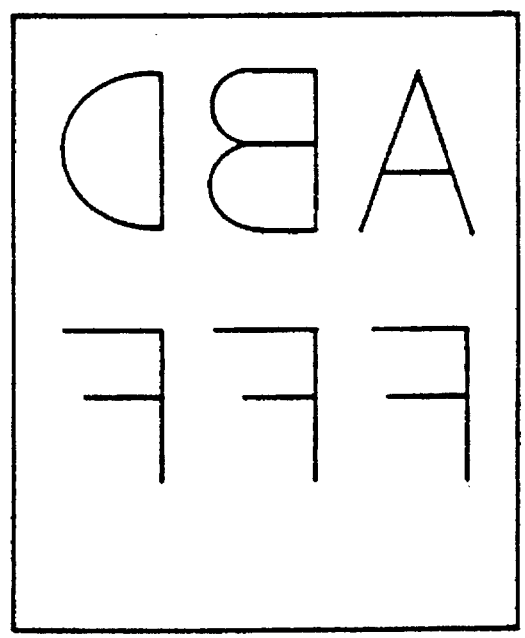
FIG. 19 is a diagram illustrating an image output obtained by image processing (total area mirror & image repeat) in the embodiment of the present invention.
Figure 20:
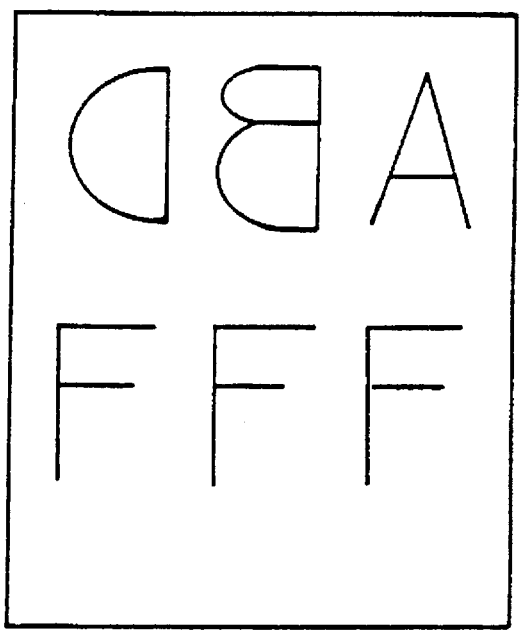
FIG. 20 is a diagram illustrating an image output obtained by image processing (total area mirror and image repeat) in the embodiment of the present invention.
Figure 21:
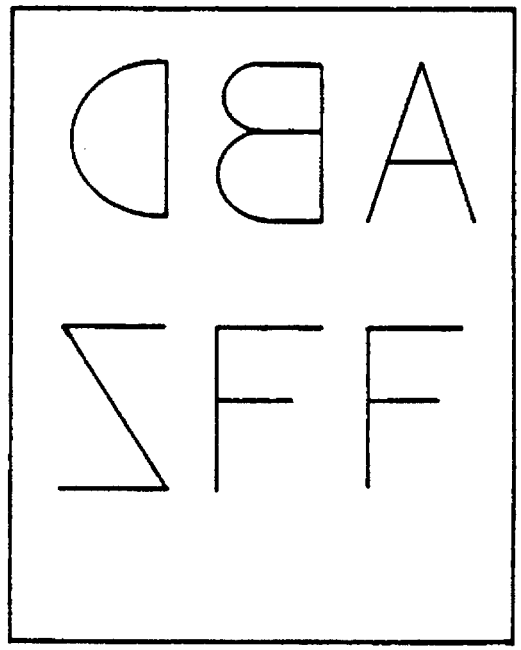
FIG. 21 is a diagram illustrating an image output obtained by image processing (total are a mirror and image repeat) in the embodiment of the present invention.

FIG. 19 shows an image output having mirror versions of characters A, B and C (total area mirror).

REPEATED OUTPUT OF DESIGNATED AREA A SPECIFIED NUMBER OF TIMES

Figure 54:
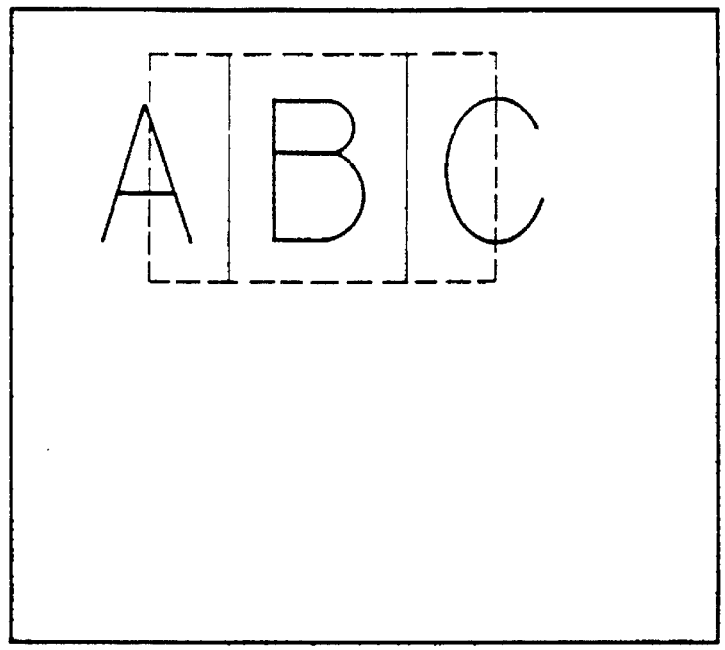
FIG. 54 is a diagram illustrating an original to be copied.
Figure 55:
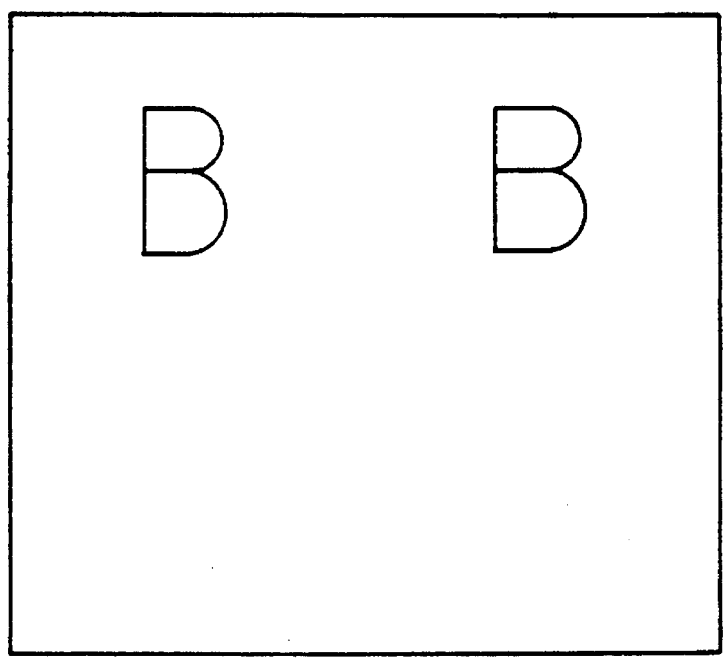
FIG. 55 is a diagram illustrating an image output derived from the original shown in FIG. 54.

A description will now be given of an operation in which a character "B" on an original shown in FIG. 54 is repeatedly output two times. Image data which is not repeated is erased before writing the image data is written into the toggle memories 31 and 32. In this manner, the toggle memories 31 and 32 store only the data indicating the character "B". A repeat area signal from the CPU indicates an area indicated by the broken line shown in FIG. 54 (character "B" should be repeated two times and therefore the repeat area has a size half of the size of the original. The repeat starting address RSAD is written into the total area address register 81, and the operation in the repeat mode is carried out. As a result, an image output shown in FIG. 55 is output. The mirror and movement processes can be carried out in the same manner as above.

The size of the repeat area is defined as follows:

(repeat area size)=[(document size)+movement distance)] /(number of times that the repeat area is repeatedly output).

With the above definition, the repeat area can be repeatedly output at equal intervals without any management by means of hardware.

REPEAT & SLANT MODE

Figure 26:
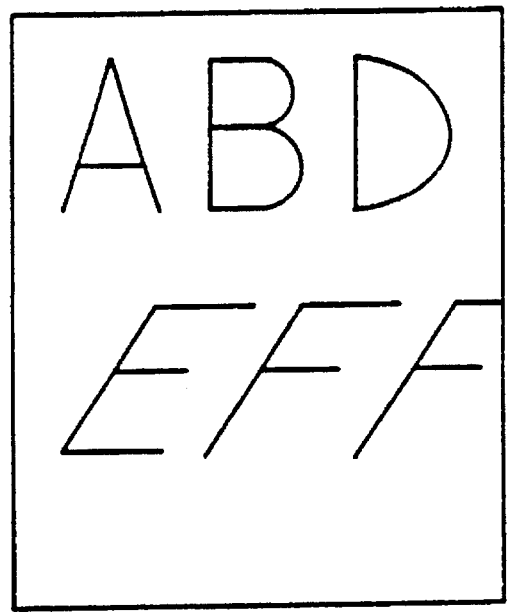
FIG. 26 is a diagram illustrating an image output obtained by image processing (image repeat & total area slant) in the embodiment of the present invention.

The operation in this mode differs from that in the repeat mode in the total area address stored in the register 81. The total area address is changed every line or every few lines as in the case of the slant mode. The total area address in the register 81 used during the repeat operation is set in the same manner as that used to obtain the output image shown in FIG. 52. Thereby, an image output shown in FIG. 26 is obtained. If it is desired to erase a character "E", corresponding image data can be erased before it is written into the memories.

Figure 27:
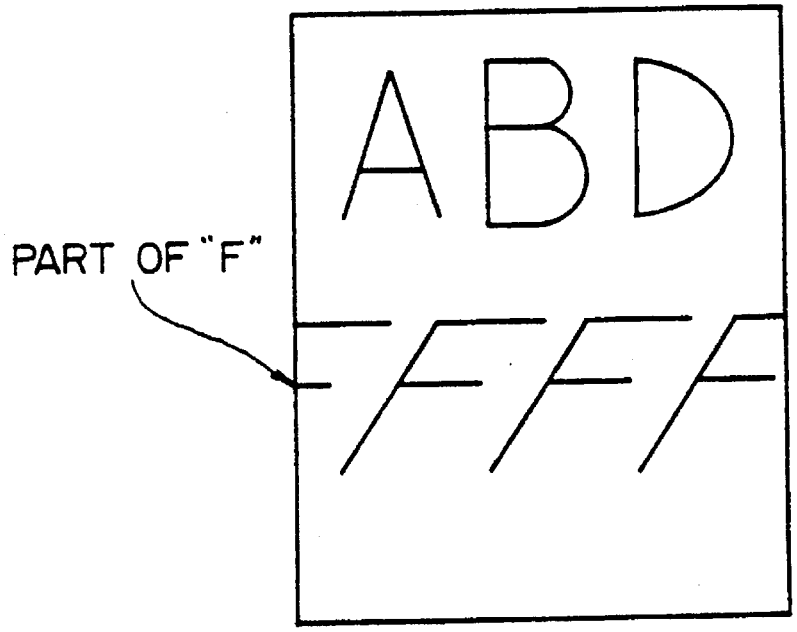
FIG. 27 is a diagram illustrating an image output obtained by image processing (image repeat & total area slant) in the embodiment of the present invention.

When an address between the repeat starting address RSAD and the repeat end address READ is selected as the total area address to be stored in the register 81, an image output shown in FIG. 27 can be obtained in which part of the slant images is lost.

Figure 28:
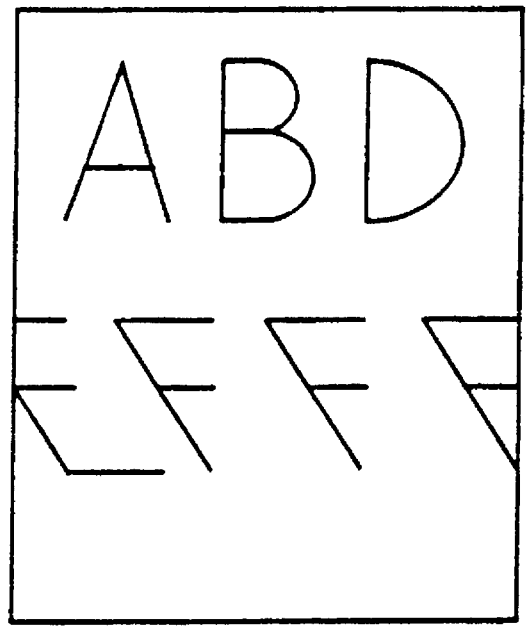
FIG. 28 is a diagram illustrating an image output obtained by image processing (image repeat & total area slant) in the embodiment of the present invention.
Figure 29:
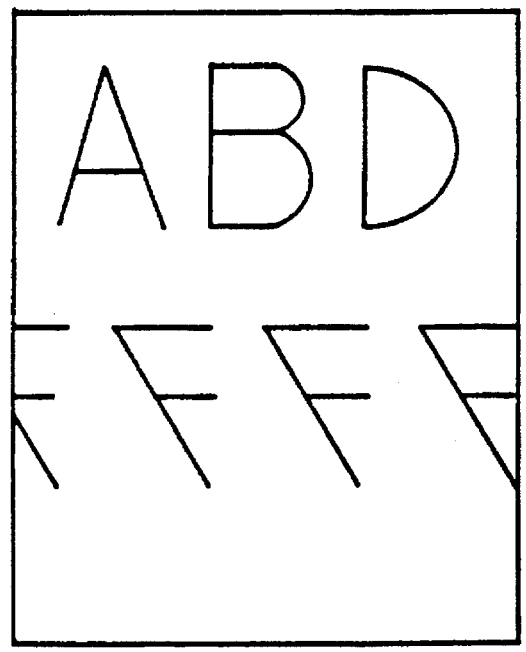
FIG. 29 is a diagram illustrating an image output obtained by image processing (image repeat & total area slant) in the embodiment of the present invention.
Figure 30:
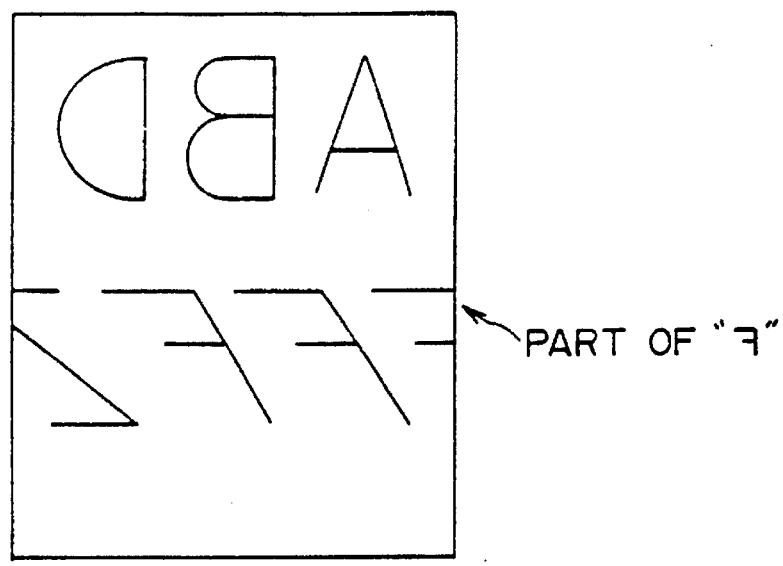
FIG. 30 is a diagram illustrating an image output obtained by image processing (image repeat & total area slant & total area mirror) in the embodiment of the present invention.
Figure 31:
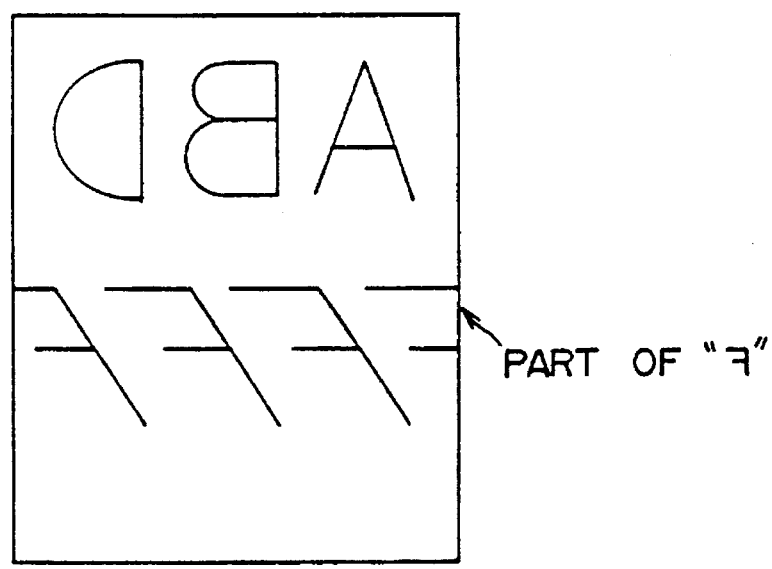
FIG. 31 is a diagram illustrating an image output obtained by image processing (image repeat & total area slant & total area mirror) in the embodiment of the present invention.
Figure 34:
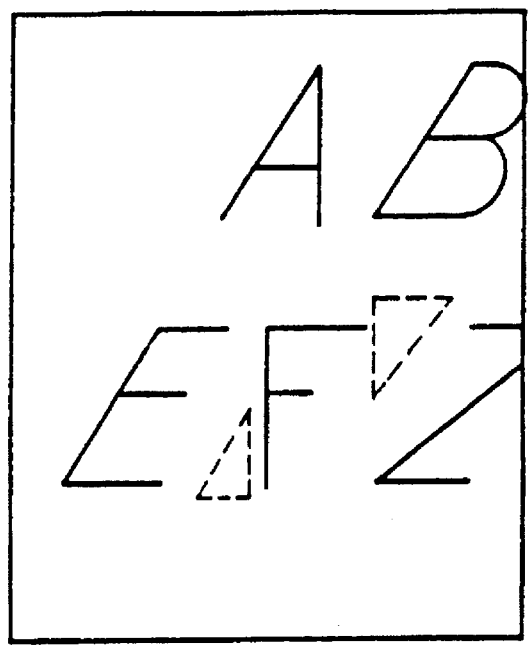
FIG. 34 is a diagram illustrating an image output obtained by image processing (total area slant & local-area mirror) in the embodiment of the present invention.
Figure 35:
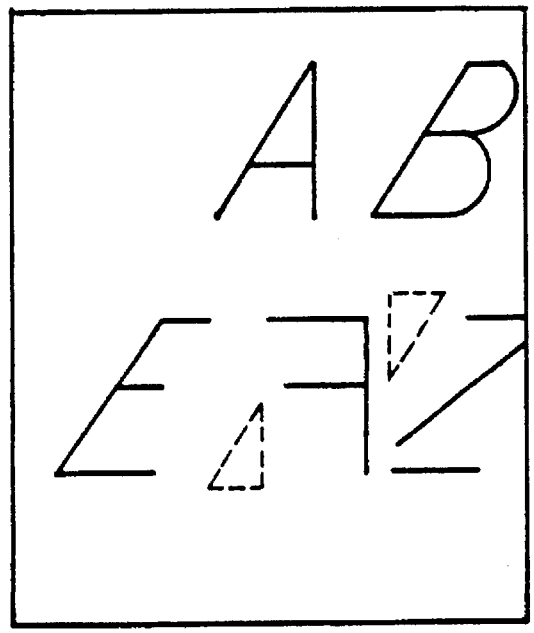
FIG. 35 is a diagram illustrating an image output obtained by image processing (total-area slant & local-area slant & local-area mirror) in the embodiment of the present invention.
Figure 36:
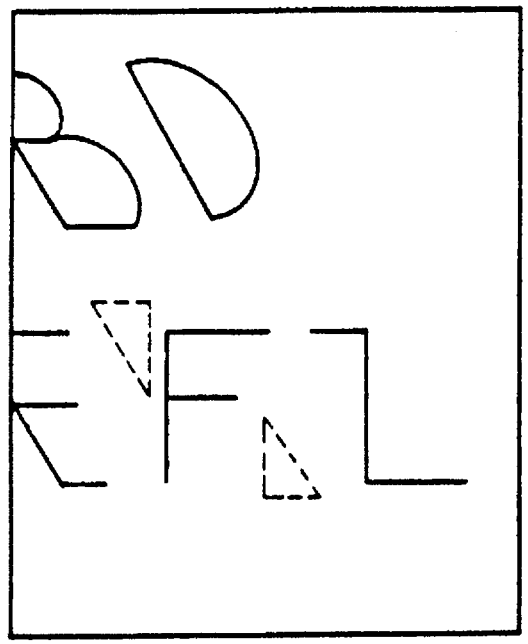
FIG. 36 is a diagram illustrating an image output obtained by image processing (total-area slant & local-area slant) in the embodiment of the present invention.
Figure 37:
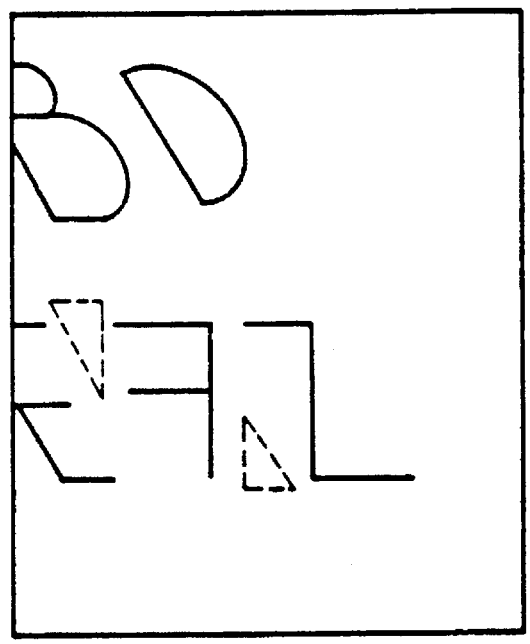
FIG. 37 is a diagram illustrating an image output obtained by image processing (total-area slant & local-area slant & local-area mirror) in the embodiment of the present invention.
Figure 38:
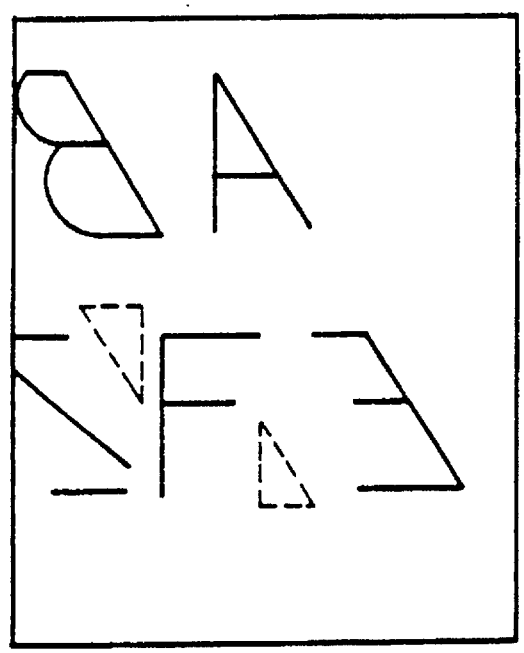
FIG. 38 is a diagram illustrating an image output obtained by image processing (total-area mirror & local-area mirror & total-area slant & local-area slant) in the embodiment of the present invention.
Figure 39:
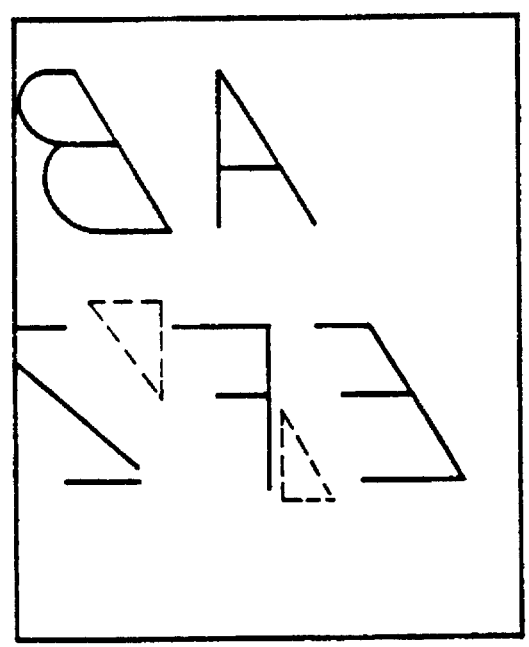
FIG. 39 is a diagram illustrating an image output obtained by image processing (total-area mirror & total-area slant & local-area slant) in the embodiment of the present invention.
Figure 40:
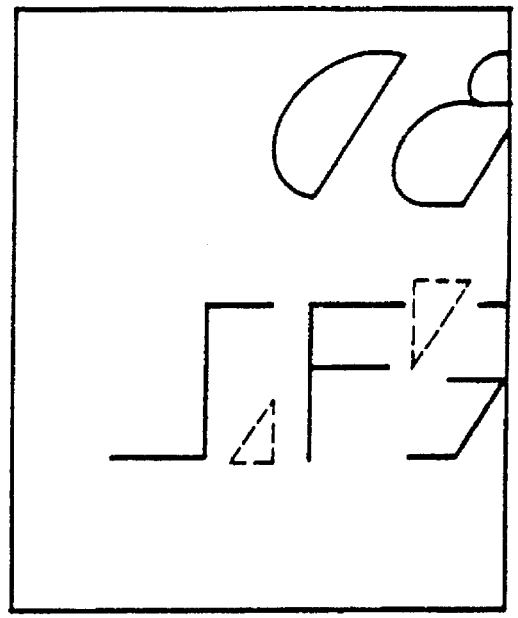
FIG. 40 is a diagram illustrating an image output obtained by image processing (total-area mirror & local-area mirror & total-area slant & local-area slant) in the embodiment of the present invention.
Figure 41:
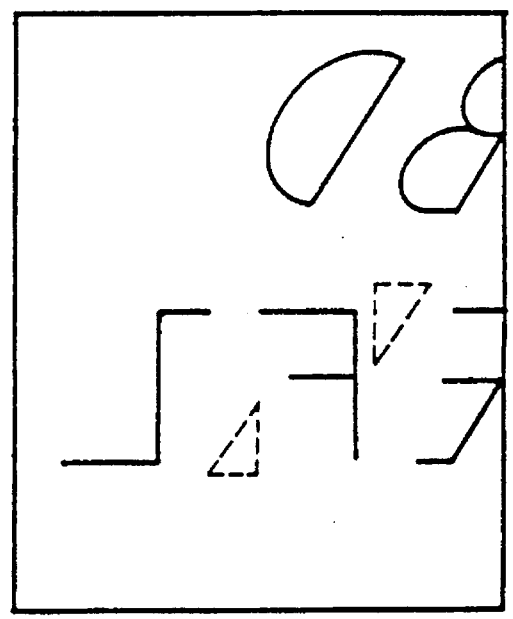
FIG. 41 is a diagram illustrating an image output obtained by image processing (total-area mirror & total-area slant & local-area mirror) in the embodiment of the present invention.
Figure 42:
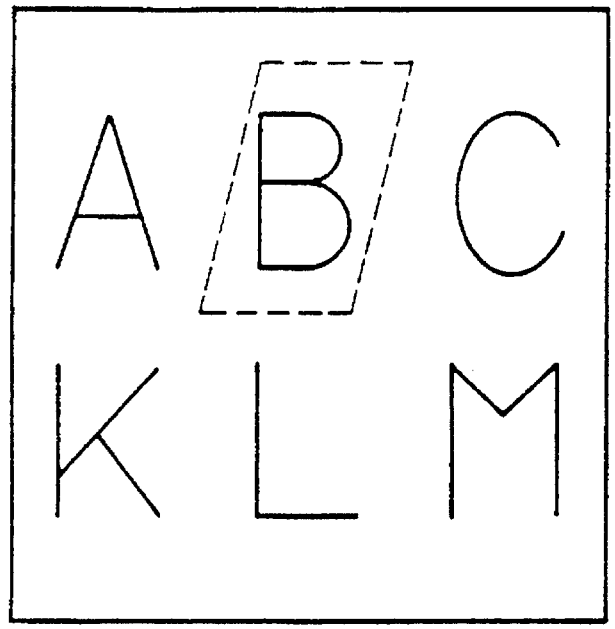
FIG. 42 is a diagram illustrating an original in which a parallelogram area is designated.
Figure 56:
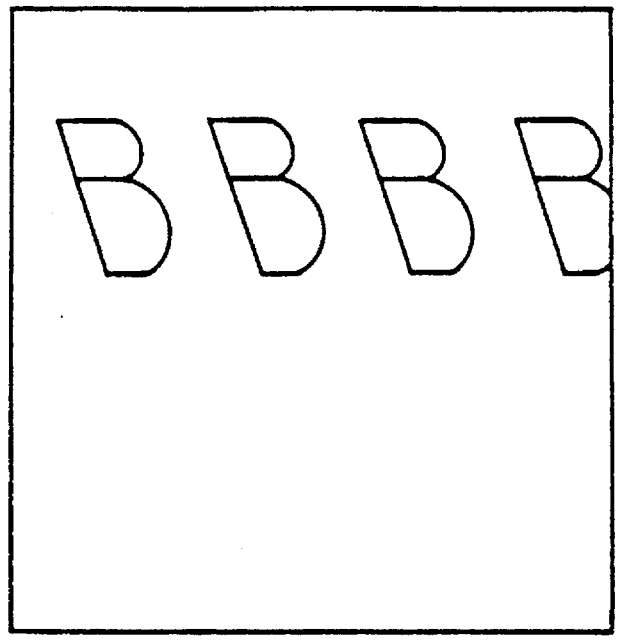
FIG. 56 is a diagram illustrating an image output derived from the original shown in FIG. 54.
Figure 57:
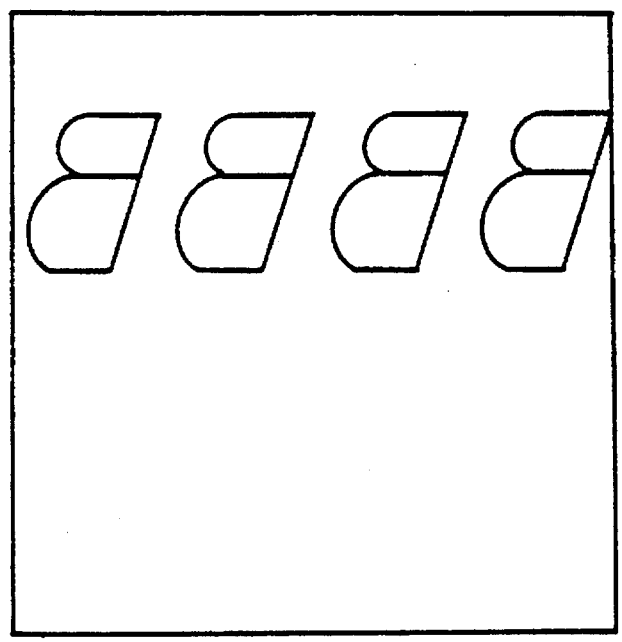
FIG. 57 is a diagram illustrating an image output derived from the original shown in FIG. 54.

Further, it is possible to adjust the total area address 81 so that output images shown in FIGS. 28 and 29 can be obtained. Furthermore, when the signal U/<D> applied to the up/down counter 100 is switched to the low level and the total area address is changed, image outputs shown in FIGS. 30 through 33 can be obtained. In order to erase character information indicating "E" or the mirror version of character "Z", the character information is erased before it is written into the toggle memories 31 and 32. Of course, it is possible to specify the number of times that the designated area is repeatedly output in the repeat & slant mode. It is also possible to designate a parallelogram area instead of a rectangular area, as shown in FIG. 42. When the total area address in the register 81 is selected so as to coincide with the repeat starting address RSAD, an image output shown in FIG. 56 can be obtained. Furthermore, by combining the above process with the mirror process, it is possible to obtain an image output shown in FIG. 57.

LOCAL-AREA MIRROR

The controller 99 outputs the loading signal RPLD synchronized with the line synchronizing signal LSYNC. The controller 99 maintains a mirror select signal MRSEL at a high level when the local-area mirror indication flag MRMout is high before the two addresses applied to the comparator 94 becomes equal to each other. In other cases, the controller 99 maintains the mirror select signal MRSEL at a low level. The controller 99 generates a loading signal DLD in the same manner as the mirror select signal MRSEL. When the loading signal DLD is high, the down/up counter 101 performs up or down counting operation on the basis of the level of the up/down instruction signal U/<D>. The controller 99 outputs a high level signal MRMin when the mirror select signal MRSEL is switched from the high level to the low level. In other cases, the controller 99 makes the signal MRMin low. The local-area mirror indication flag MRMout output from the selector 89 shown in FIG. 9 functions as a local-area mirror designation flag. When the local-area mirror indication flag MRMout is high, the local-area mirror mode is active. The signals other than the above-mentioned signals are low.

A description will now be given of an operation in which character "F" in an area indicated by the broken line shown in FIG. 12 is subjected to the mirror process, and thereby an image output shown in FIG. 13 is obtained.

The total area address is written into in the register 81 in tile same as that used in the normal mode. In the sub-scanning direction, there is no designated area before the designated area indicated by the broken area shown in FIG. 12. Hence, image data is processed in the same manner as that in the normal mode before the sub-scanning operation reaches the designated area. The area signal continuously indicates "2" (mirror) while the designated area is being scanned. While the original area outside of the designated area is being scanned, the area signal indicates "0" (normal processing). When the area signal switches from "0" to "2", the repeat area signal decoder 115 writes a mirror starting address into the memory 102 or 103, and writes information indicating the mirror process into the memory 106 or 107.

When the area signal switches from "2" to "0", a mirror end address is written into an area in the memory 104 or 105 corresponding to the area number 0. In response to the-line synchronizing signal LSYNC, the reading and writing operations of the memories 102 and 103 are interchanged. When the memory 102 is operating in the data writing mode, the memory 103 is operating in the data reading mode. When the line synchronizing signal LSYNC is generated, the memory 102 is switched to the data reading mode and the memory 103 is switched to the data writing mode. The memories 104 and 105 and the memories 106 and 107 operate in the same manner as the memories 102 and 103.

The mirror end address, the mirror starting address and the mirror select flag RFLAG are used for read control (see FIG. 10) with a delay equal to one line. Hence there is no offset between the image data and the area signal with respect to the direction of a line (the sub-scanning direction).

Referring to FIG. 8, when the line synchronizing signal LSYNC is generated, the down/up counter 101 functions as a down counter since the up/down instruction signal U/<D> is high. This instruction signal U/<D> is also applied to the switch unit 85, which outputs the mirror starting address MSAD and the mirror end address MEAD via the output terminals X and Y, respectively. The area memory controller 108 shown in FIG. 9 sets the area number to the initial value 0.

When the count value of the up/down counter 100 increases and becomes equal to the mirror starting address MSAD at the comparator 94 (the local-area mirror indication signal MRMout is high), the controller 99 switches the loading signal DLD from the low level to the high level, and the down/up counter 101 is switched to a state in which the mirror end address MEAD is loaded to a down-counting state. Simultaneously, the controller 99 switches to the mirror select signal MRSEL to the high level. Thereby, the read address from the selector 90 and the adder 91 is the count value of the down/up counter 101. The count value of the down/up counter 101 is sequentially decreased. During this time, the count value of the up/down counter 100 is sequentially increased (the read address is the output of the down/up counter 101).

When the count value of the down/up counter 101 becomes equal to the mirror starting address MSAD at the comparator 95 (the local-area mirror indication flag MRMout is high), the controller 99 switches the loading signal DLD from the high level to the low level. Hence, the down/up counter 101 is switched to the load state again, and the controller 99 switches the mirror select signal MRSEL to the low level. At the same time as the above, the controller 99 changes the signal MRMin in the order L-H-L, and the area memory controller 108 changes the area number from 0 to 1. The memories 102–107 are initialized (the contents thereof are reset to zero) when the operation is switched from the read mode to the write mode. With respect to area number 0, no data is written in the write operation on the previous line, and the signals SHMout and MRMout (local-area mirror indication flag) are low. The read address is the count value of the up/down counter 100 until the line synchronizing signal is generated. At this time, the up/down counter 100 functions as an up counter, and the count value thereof sequentially increases.

FIG. 11 indicates the read address generated in the above manner. Hatched areas denote the read address.

Figure 43:
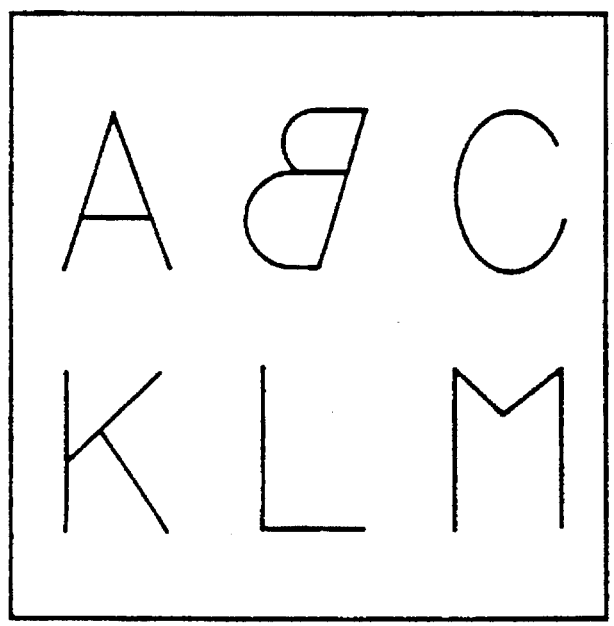
FIG. 43 is a diagram illustrating an image output obtained by image processing for the original shown in FIG. 42.

By designating a parallelogram area as shown in FIG. 42, an output image shown in FIG. 43 can be obtained in which a slant mirror version of character "B" is output. In order to obtain a normal mirror version, the designated area is not limited to rectangular areas, and arbitrary shapes which are present with respect to the main scan can be used. That is, the count operation on the read address is reversed with respect to only the designated mirror area.

MIRROR & LOCAL-AREA MIRROR

The operation in this mode differs from that in the local-area mirror mode in the total area address stored in the register 81. The total area address used in the total-area mirror & local-area mirror mode is the same as that used in the mirror mode.

Referring to FIG. 8, when the line synchronizing signal LSYNC is generated, the up/down counters 100 and 101 function as down and up counters, respectively, because the instruction signal U/<D> is low. This instruction signal U/<D> is also applied to the switch unit 85, which outputs the mirror end address MEAD and the mirror starting address MSAD via the output terminals X and Y, respectively. Data indicating the area number in the area memory controller 108 is zero because the area number last written therein is zero.

When the count value of the up/down counter 100 sequentially decreases and becomes equal to the mirror end address HEAD at the comparator 94 (local-area mirror indication flag MRMout is high), the controller 99 switches the loading signal DLD from the low level to the high level, and the down/up counter 101 switches from a state in which the mirror starting address is loaded thereto to a state in which the counter 101 functions as an up counter. Simultaneously, the controller 99 switches the mirror select signal MRSEL from the low level to the high level. Hence, the read address is the count address of the down/up counter 101, which then performs the down-counting operation. At this time, the up/down counter 100 performs the up-counting operation (the read address is the output signal of the down/up counter 101).

When the count value of the down/up counter 101 becomes equal to the mirror end address MEAD at the comparator 95 (local-area mirror indication flag MRMout is high), the controller 99 switches the loading signal DLD from the high level to the low level. Hence, the down/up counter 101 switches to the loading state again, and the controller 99 switches the mirror select signal MRSEL to the low level. Simultaneously, the controller 99 changes the signal MRMin in the order L-H-L, and thereby the area memory controller 108 changes the area number from 0 to 1. Then, as has been described with respect to the local-area mirror mode, the signals MRMout (local-area mirror indication flag) and SHMout become low, and the read address is the count value of the up/down counter 100 before the line synchronizing signal LSYNC is generated. In this case, the up/down counter 100 functions as an up counter, and the read address is sequentially decreased.

FIG. 11 indicates the read address obtained in the above-mentioned manner. The hatched areas denote the read address. That is, the count operation on the read address is reversed with respect to only the designated local-area mirror area. In this manner, an output image shown in FIG. 18 can be derived from the original shown in FIG. 12. It will be noted that "ABD" is processed in the mirror mode.

SLANT & LOCAL-AREA MIRROR MODE

The operation in this mode differs from that in the local-area mirror mode in the total area address. The total area address used in the slant & local-area mirror mode is updated every line or every few lines. The coordinate (address) to be stored in the local-area mode is based on the write address, and the coordinate to be read in the local-area mode is based on the read address. Hence, an output image obtained in the slant & local-area mirror mode is obtained by performing the slant process for an original image and then the local-area mirror process for a slanted image. Output images shown in FIGS. 62 and 63 can be derived from the original shown in FIG. 12 using the slant & local-area mirror mode.

REPEAT AND LOCAL-AREA MIRROR MODE

The controller 99 shown in FIG. 8 generates the loading signal RPLD when the line synchronizing signal LSYNC is generated or when the repeat select flag RFLAG is valid and an address match is obtained at the comparator 93. The select signal LSEL is high when the repeat select flag RFLAG is valid, an address match is obtained at the comparator 93 and the line synchronizing signal is not generated. In other cases, the select signal LSEL is maintained at the low level. In this mode, the circuit shown in FIG. 10 operates in the same manner as that in the repeat mode.

Before address matches are respectively obtained at the comparators 94 and 95, the controller 99 maintains the mirror select signal MRSEL at the high level when the local-area mirror indication flag MRMout output via the selector 89 shown in FIG. 9 is high. In other cases, the mirror select signal MRSEL is low. The down/up counter 101 functions as an up or down counter based on the level of the up/down instruction signal U/<D>. The signal MRMin is switched to the high level when the mirror select signal MRSEL switches from the high level to the low level. In other cases, the controller 99 maintains the signal MRMin at the low level. The controller 99 switches the loading signal RLD from the low level to the high level when the repeat select flag RFLAG is valid (high) and an address match is obtained at the comparator 93. In other cases, the loading signal RLD is low. The controller 99 sets all the signals other than the above signals to the low level.

Figure 58:
FIG. 58 is a diagram illustrating an original to be copied.

A description will now be given of an operation in which "EFZ" in a block indicated by the broken line shown in FIG. 58 is repeatedly output and an mirror version of "F" is output. The total area address is the same as the repeat starting address RSAD. There is no designated area before the sub-scan reaches the designated area indicated by the broken line. Hence, the system operates in the same manner as that in the normal mode. The area signal indicates 1 (repeat) while E and Z are being scanned, and indicates 4 (repeat & mirror) when F is being scanned. While the areas other than the above areas are being scanned, the area signal indicates 0 (normal).

The repeat area signal decoder 115 writes the repeat select flag and the repeat starting address into the register 111 when the area signal switches from 0 to 1. When the area signal switches from 1 to 4, the area memory controller 108 shown in FIG. 9 outputs the address corresponding to area number 0, and the mirror starting address MSAD is written into the corresponding area of the memory 102 or 107 under the control of the area memory controller 108. Simultaneously, the area memory controller 108 writes information indicating the mirror process into the memory 106 or 107. When the area signal switches from 4 to 1, the controller 108 outputs the address corresponding to area number 0, and the mirror end address MEAD is written into the memory 104 or 105 under the control of the controller 108. When the area signal switches from 1 to 0, the repeat end address READ is written into the register 112 by the repeat area signal decoder 115.

When the line synchronizing signal LSYNC is generated, the contents of the registers 111 and 112 are transferred to the registers 113 and 114, respectively. When the memory 102 is maintained in the write mode, the memory 103 is maintained in the read mode. When the line synchronizing signal is generated, the memory 102 is switched to the read mode, and the memory 103 is switched to the write mode. The memories 104 and 105 operate in the same manner as the memories 102 and 103, and the memories 106 and 107 operate in the same manner as the memories 102 and 103.

Referring to FIG. 8, when the line synchronizing signal LSYNC is generated, the select signal LSEL is low, and the loading value of the up/down counter 100 is the total area address (repeat starting address RSAD). At this time, the up/down instruction signal U/<D> of the up/down counter 100 is high, and therefore the outputs X and Y of the switch unit 84 are the repeat starting address RSAD and the repeat end address READ, respectively. Further, the outputs X and Y of the switch unit 85 are the mirror starting address MSAD and the mirror end address MEAD, respectively. The area number output by the area memory controller 108 is the initial value 0.

When the count-value of the up/down counter 100 increases to an address value equal to the mirror starting address MSAD supplied to the comparator 94 (the local-area mirror indication flag RMRout is high), the controller 99 switches the loading signal DLD from the low level to the high level. Further, the down/up counter 101 is switched from a state in which the mirror end address MEAD is loaded thereto to a state in which the count value is decremented from the loaded mirror end address MEAD. Simultaneously, the controller 99 switches the mirror select signal MRSEL to the high level.

Hence, the read address is the count value of the down/up counter 101, which is sequentially decremented. At this time, the up/down counter sequentially increases the count value. When the address indicated by the down/up counter 101 becomes equal to the mirror starting address MSAD (the local-area mirror indication flag MRMout is high), the controller 99 switches the loading signal from the high level to the low level. Thereby, the down/up counter 101 is switched to the loading state, and the mirror select signal MRSEL is switched to the low level by the controller 99. Simultaneously, the signal MRMin switches in the order L-H-L, and the area memory controller 108 shown in FIG. 9 switches the area number from 0 to 1. With respect to the area number 1, no data is written in the write operation on the previous line. Hence, both the signals SHMout and MRMout are switched to the low level.

Figure 59:
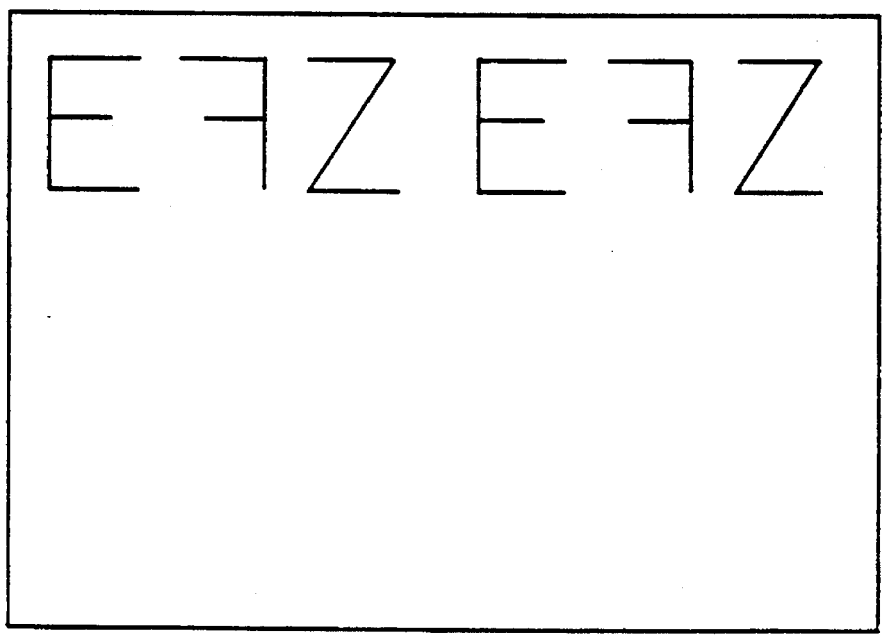
FIG. 59 is a diagram illustrating an image output derived from the original shown in FIG. 58.

When the count value of the up/down counter 100 becomes equal to the repeat end address READ at the comparator 93 (the repeat select flag RFLAG is valid), the controller 99 shown in FIG. 8 switches the select signal LSEL to the high level and switches the loading signal RPLD to the low level together with the loading signal RLD. Hence, the area number generated by the area memory controller 108 is switched to the initial value 0 with respect to the line being processed. The repeat starting address RSAD is loaded to the up/down counter 100 in response to the switching of the loading signal RPLD from the low level to the high level. The instruction signal U/<D> is maintained at the high level, and hence the up/down counter 100 starts the up-counting operation again. The operation previously described is repeatedly carried out. As a result, an image output shown in FIG. 59 can be obtained.

REPEAT & MIRROR & LOCAL-AREA MIRROR

The operation in this mode differs from the operation in the repeat & local-area mirror mode in the total area address stored in the register 81. The total area address used in the repeat & mirror & local-area mirror mode is selected in the same manner as that used in the mirror mode.

When the line synchronizing signal is generated, the select signal LSEL is low, and the total area address (repeat end address READ) is loaded to the up/down counter 100. At this time, the up/down instruction signal U/<D> is high, and the switch unit 84 outputs the repeat end address READ and the repeat starting address RSAD via the outputs X and Y, respectively. The down/up counter 101 functions as an up counter, and the outputs X and Y of the switch unit 85 are the mirror end address MEAD and MSAD, respectively. The area number output by the area memory controller 108 is 0 because the area number last written is 0.

When the count value of the up/down counter 101 increases to the mirror end address MEAD supplied to the comparator 94 (the local-area mirror indication flag MRMout is high), the controller 99 switches the loading signal DLD from the low level to the high level. Hence, the down/up counter 101 is switched from the MSAD loading state to the up-count state. Simultaneously, the controller 99 switches the mirror select signal MRSEL to the high level.

When the count value of the up/down counter 100 becomes equal to the repeat starting address RSAD at the comparator 93 (the repeat select flag is high), the controller LSEL switches the signals RPLD and the RLD to the low level. Hence, the area number output by the area memory controller 108 becomes the initial value 0 (the area number stored last) of the line currently processed. At this time, the repeat end address READ is loaded to the up/down counter 100. The up/down instruction signal U/<D> is maintained at the low level, and the up/down counter 100 starts the up-counting operation again.

Figure 60:
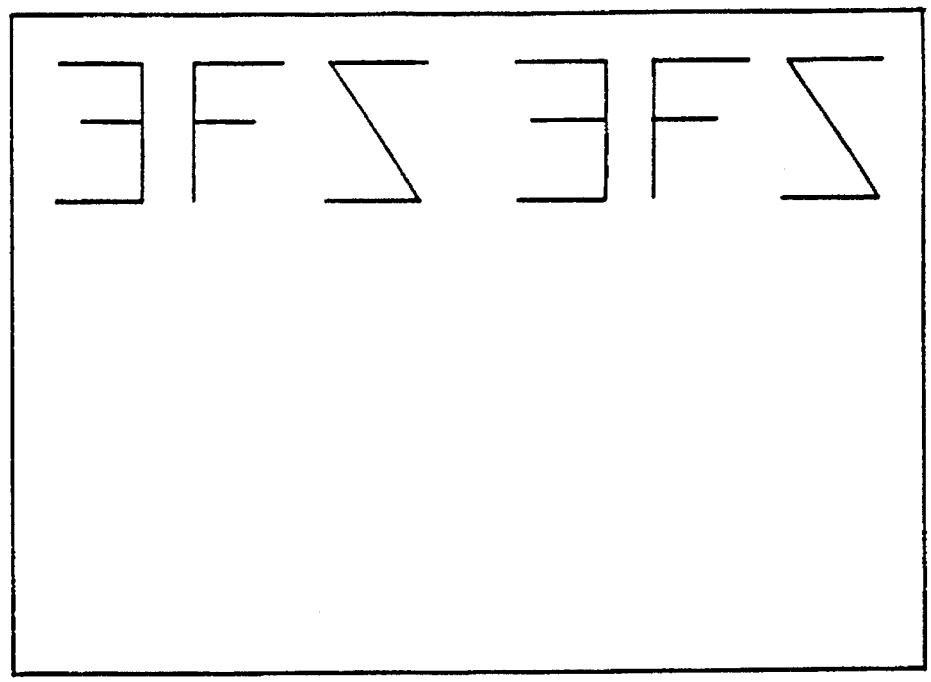
FIG. 60 is a diagram illustrating an image output derived from the original shown in FIG. 58.

In the above-mentioned manner, an image output shown in FIG. 60 can be derived from the original shown in FIG. 58. It is possible to arbitrarily combine the movement mode and/or the slant mode.

LOCAL-AREA SLANT MODE

The local-area slant mode includes two shape changing modes and two color modes.

(1) Shape changing system modes

Figure 45:
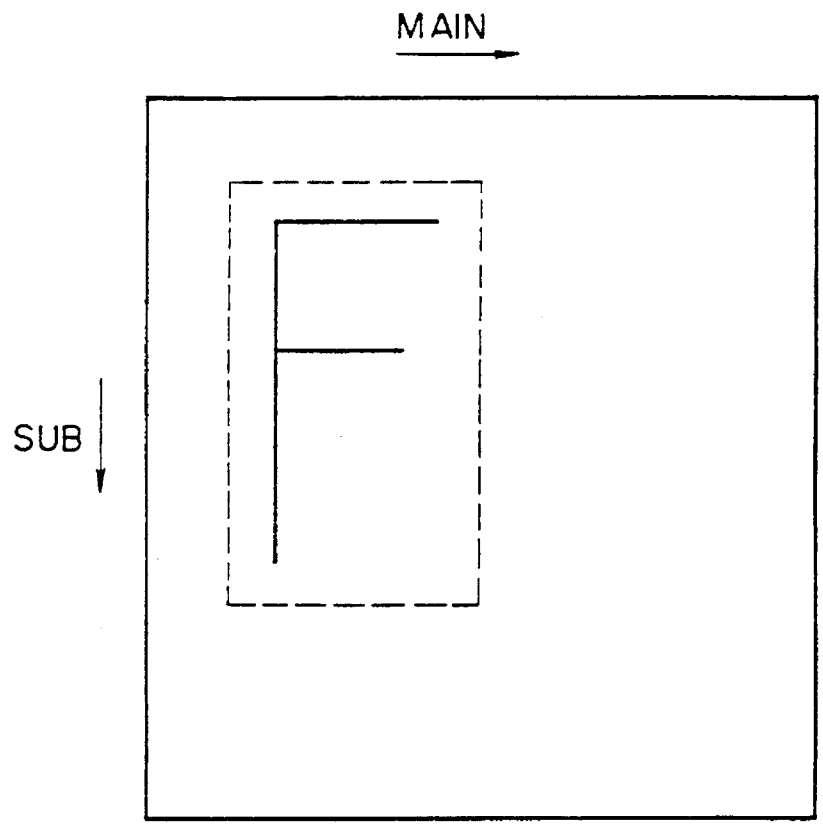
FIG. 45 is a diagram illustrating an original to be copied.
Figure 46:
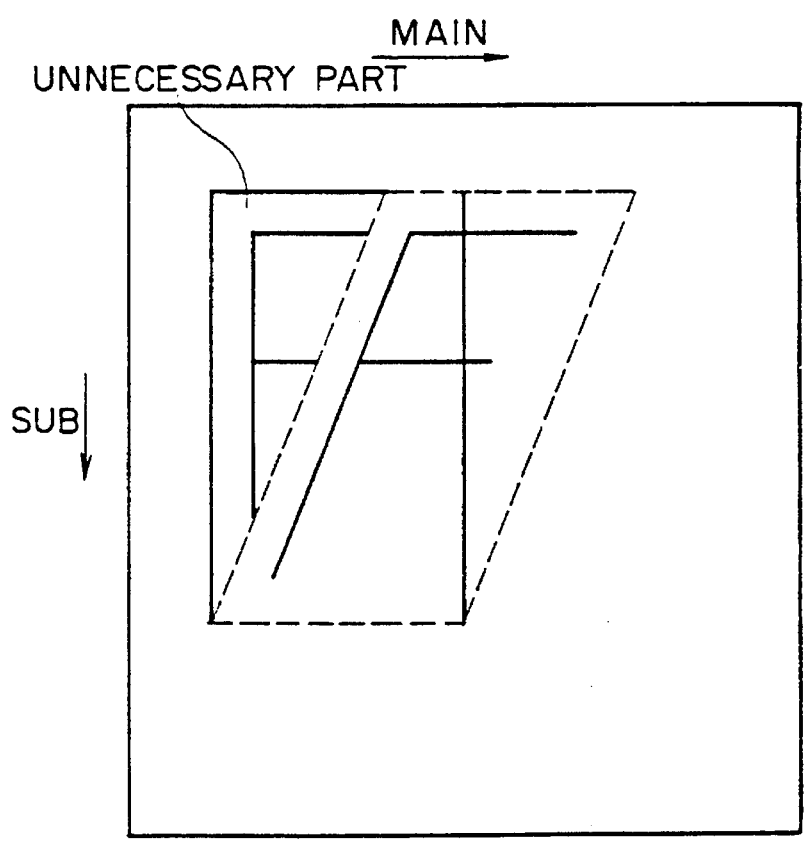
FIG. 46 is a diagram illustrating an image output derived from the original shown in FIG. 45.
Figure 47:
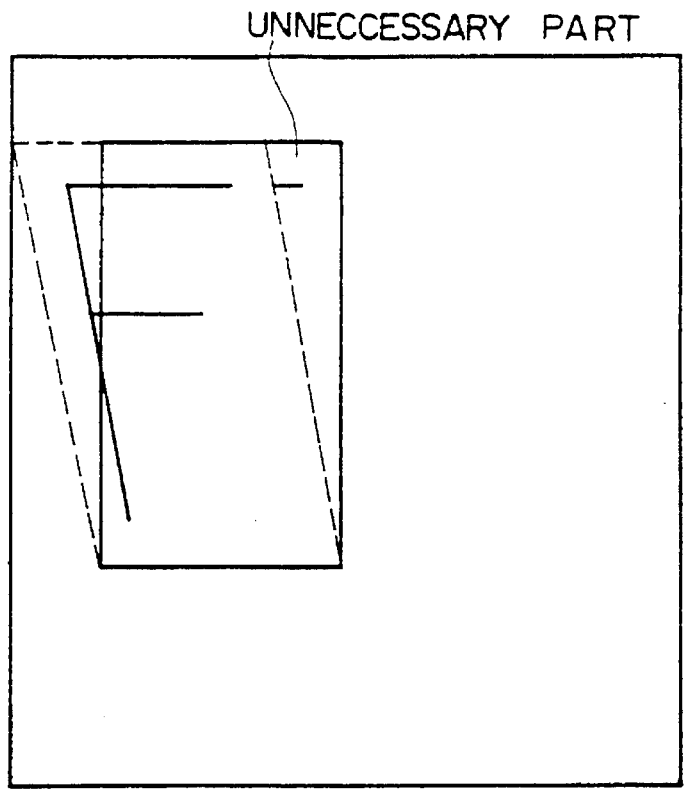
FIG. 47 is a diagram illustrating an image output derived from the original shown in FIG. 45.

For example, image outputs shown in FIGS. 46 and 47 can be derived from the original shown in FIG. 45 by the slant process. Solid-line portions indicate the position of an area originally designated.

(i) In-area slant (in FIGS. 46 and 47)

An image output is output in which only an overlapping area where the area indicated by the solid line and the area indicated by the broken line overlap with each other is slanted.

(ii) Extended slant (in FIGS. 46 and 47)

An image output is output in which the area indicated by the broken line is slanted.

(2) Color modes

Even when either the shape-changing mode (i) or (ii) is carried out, a part of the area indicated by the solid line is output. This part is slanted by the slant process, and is not necessary to be output. That is, it is desirable to output the above part as a background area. The color modes are intended to select the color of such a background area portion corresponding to the unnecessary area.

(i) Constant color

A color is read in an arbitrary point in the vicinity of the slant designation area, and the same color as the above is selected as a color for the background area corresponding to the unnecessary area.

(ii) Averaged color

Color data on a few pixels in the starting or ending position of the slant-designated area in each line are averaged to determine an average color of the background area corresponding to the unnecessary area. In this manner, the color may be changed in each line. The data concerning the unnecessary area can be converted to arbitrary area (data 0, for example) as in the case of the normal process (area number is "0").

(3) In-area slant

The controller 99 shown in FIG. 8 generates the loading signal RPLD synchronized with (the same as) the line synchronizing signal LSYNC. Before address matches are respectively obtained at the comparators 94 and 95, the controller 99 sets a slant select signal SHSEL to the high level when a local-area slant indication flag SHMout is high (valid). In other cases, the slant select signal SHSEL is maintained at the low level.

The loading signal DLD is controlled in the same manner as the slant select signal SHSEL. When the loading signal is high, the down/up counter 101 is released from the loading state, and functions as an up or down counter depending on the level of the level of the down/up terminal D/<U>. When the slant select signal SHSEL switches to the high level, the circuits shown in FIGS. 5 and 6 start to operate. The signals of the controller 99 other than the above-mentioned signals are maintained at the low level.

Referring to FIGS. 5 and 6, when the input area signal does not select the slant mode, both the data conversion signal and the average signal output from the data selecting unit 35 are low. In this case, the area signal and image data are delayed and output. When the area signal does not select the slant mode and the data selecting signal output from the control unit 33 is low, the averaging unit 52 shown in FIG. 6 is initialized and data 0 is output therefrom.

When the input area signal selects the slant mode and the data selecting signal is low, data concerning an unnecessary area is delayed by the delay circuit 51 with a delay of time equal to that of the delay circuit 41. The slant data controller 43 switches the data conversion signal to the high level. The area signal selected from the selector 44 has a predetermined value stored in the area data 42. Further, output image data is obtained via the selector 55.

The averaging signal is continuously maintained at the high level when data on eight pixels are averaged. In this case, each of the delay circuits 41 and 51 has a delay of time equal to eight pixels. The averaging unit 52 holds the image data without any change except for the initializing and averaging operations.

When the area signal indicates the slant mode and the data selecting signal is high, data concerning an area to be slanted is received. Hence, the data is delayed by the delay circuit 51 with a predetermined delay of time equal to that of the delay circuit 41, and the input area signal is delayed. The output area signal is the input area signal, and the output image data is the input image data.

Figure 48:
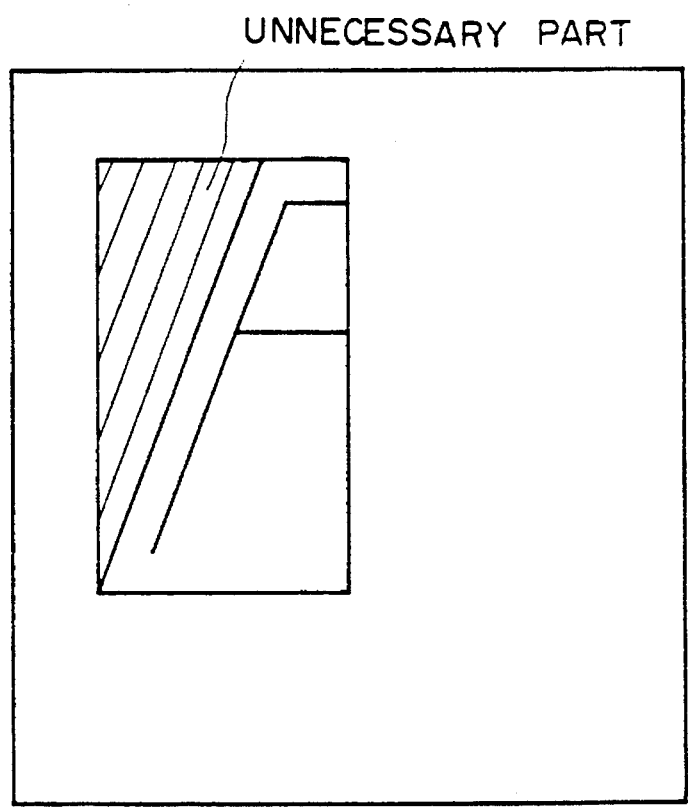
FIG. 48 is a diagram illustrating an image output derived from the original shown in FIG. 45.
Figure 49:
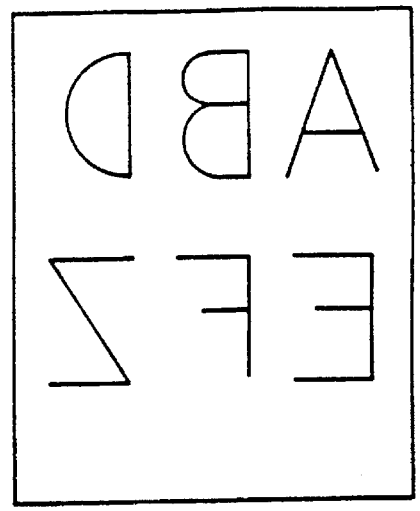
FIG. 49 is a diagram illustrating an image output obtained by image processing (mirror) in the embodiment of the present invention.

A description will now be given of an operation in which an image output shown in FIG. 48 is derived by subjecting a block indicated by the broken line to the partial slanting process.

The partial addition address stored in the register 82 indicates a value to be added to or subtracted from the total area address stored in the register 81. The total area address stored in the register 81 is the same as that used in the normal mode. Since there is no designated area in the sub-scanning direction before the designated area indicated by the broken line is scanned in the sub-scanning direction. Hence, the same operation as in the case of the normal mode is carried out until the designated area is scanned.

The area signal indicates 3 when the designated area indicated by the broken line on the original is being processed. In other cases, the area signal indicates 0 (normal mode). When the area signal switches from 0 to 3, the area memory controller 108 outputs the address corresponding to area number 0, and causes the slant starting address t be written into the memory 102 or 103 under the control of the area memory controller 108. Simultaneously, information indicating the slanting process is stored in the memory 106 or 107.

When the area signal switches from 3 to 0, the controller 108 outputs the address corresponding to area number 0, and the slant ending address into the memory 104 or 105. When the line synchronizing signal LSYNC is generated, the modes of the memories 102 and 103 are interchanged. When the memory 102 is operating in the data writing mode and the memory 103 is operating in the data reading mode, the memories 102 and 103 are switched to the data reading and writing modes, respectively. The memories 104 and 105 and the memories 106 and 107 operate in the same manner as the memories 101 and 102.

That is, the slant starting address, the slant ending address and the slant process information is used for read control (FIG. 10) with a delay corresponding to one line. Hence, there is no offset between the image data and the area signal in the line direction (sub-scanning direction). The content of the partial addition address in the register 82 is updated every line or every few lines.

Referring to FIG. 8, when the line synchronizing signal LSYNC is generated, the signal U/<D> is high and the down/up counter 101 functions as a down counter. Further, the switch unit 85 selects the slant starting address MSAD and the slant end address MEAD via its outputs X and Y, respectively. The area number output by the area memory controller 108 is the initial value 0.

When the count value of the up/down counter 100 increases to the slant starting address MSAD at the comparator 94 (the local-area slant indication flag SHMout is high), the controller 99 shown in FIG. 8 switches the loading signal DLD from the low level to the high level, and the down/up counter 101 is switched from a state in which the slant end address MEAD is loaded to a state in which the counter 101 functions as a down counter. Simultaneously, the controller 99 switches the slant select signal SHSEL to the high level, and switches the data selecting signal to the high level.

The down/up counter 101 sequentially decrements its count value, and the up/down counter 100 sequentially increments its count value. The read address obtained at this time is the sum of the address value indicated by the counter 100 and the partial addition address value. Hence, only the local-area-slant-designated area can be moved. An unnecessary part can be detected by the read area signal and the data selecting signal obtained with the address used before the local-area slanting process.

When the count value of the down/up counter 101 becomes equal to the slant starting address MSAD (the local-area slant indication flag SHMout is high), the controller 99 shown in FIG. 8 switches the load signal DLD from the high level to the low level, and hence the down/up counter 101 is switched to the loading state. Further, the controller 99 switches the slant mode selecting signal SHSEL to the low level. Simultaneously, the signal SHMin switches in the order L-H-L, and hence the area memory controller 108 shown in FIG. 9 switches the area number from 0 to 1. The contents of the memories 102–107 are initialized (become zero) when the mode is switched from the read mode to the write mode. Hence, with respect to area number 1, no data is written in the data writing operation on the previous line. Thus, the signals SHMout (local-area slant indication flag) and MRMout (local-area mirror indication flag) are switched to the low level. Until the line synchronizing signal is generated, the read address is the output of the up/down counter 100.

With respect to an unnecessary area part, the data converting unit 34 outputs either the constant-color data or the averaged data in response to a selection input by the operator before the copying operation is started. In this manner, the read address is increased or decreased with respect to only the area to which the slanting mode is designated.

It is possible to combine the in-area slant process with the mirror process because the control sequence in the in-area process is almost the same as that in the mirror process. It is also possible to designate arbitrary shapes of areas to which the in-area slant process is subjected.

(4) Extended Slant

Referring to FIG. 8, the controller 99 outputs the loading signal RPLD synchronized with the line synchronizing signal LSYNC. Before address matches are obtained at the comparators 96 and 97, the controller 99 switches the slant selecting signal SHSEL to the high level when the local-area slant indication signal SHMout is high. In other cases, the slant selecting signal SHSEL is low. The loading signal DLD is generated in the same manner as the slant selecting signal SHSEL. When the loading signal DLD is high, the down/up counter 101 is released from the loading state and functions as an up or down counter on the basis of the level of its terminal signal D/<U>. The signal SHMin is switched to the high level when the slant selecting signal SHSEL is switched from the high level to the low level. In other cases, the signal SHMin is low. When the slant selecting signal SHSEL becomes high, the circuits shown in FIGS. 5 and 6 are activated. The slant selecting signal SHSEL changes in the same manner as that in the in-area slant process.

Figure 22:
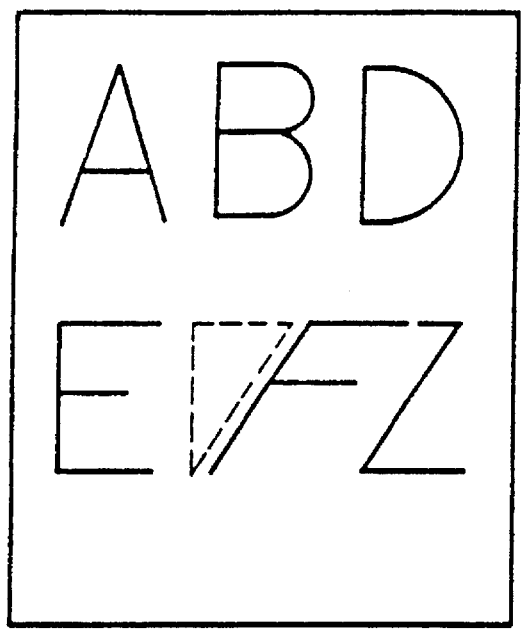
FIG. 22 is a diagram illustrating an image output obtained by image processing (local-area slant) in the embodiment of the present invention.
Figure 24:
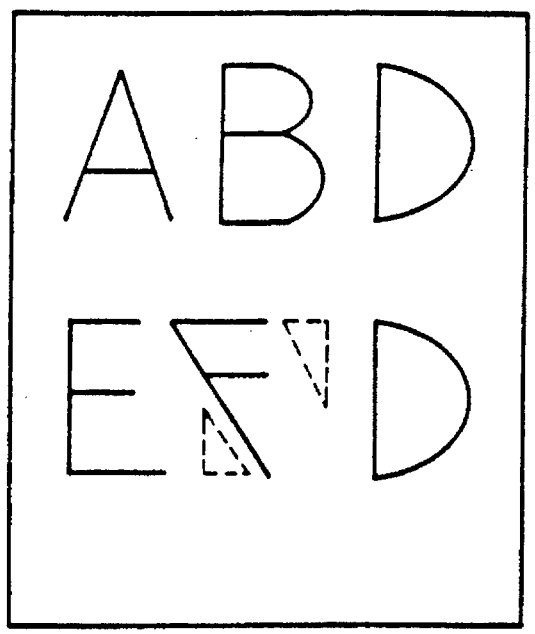
FIG. 24 is a diagram illustrating an image output obtained by image processing (local-area slant) in the embodiment of the present invention.

A description will now be given of an operation in which image outputs shown in FIGS. 22 and 24 are obtained by slanting the designated area indicated by the broken line.

The partial addition address stored in the register 82 is used to increase or decrease the total area address of the partial slant area stored in the register 81. Data is updated every line or every few lines. The total area address in the register 81 is the same as that used in the normal mode. The extended addition address stored in the register 83 is the same as the partial addition address in the register 82. There is no designated area in the sub-scanning direction before the designated area indicated by the broken line is scanned in the sub-scanning direction. Hence, the operation of the normal mode is performed before the designated area indicated by the broken line is scanned.

The area signal indicates 3 (slant mode) when the designated area indicated by the broken line on the original is scanned. With respect to areas other than the designated area, the area signal indicates 0 (normal mode). When the area signal switches from 0 to 3, the area memory controller 108 outputs the address corresponding to area number 0, and the slant starting address is stored in the memory 101 or 103. Simultaneously, information indicating the slant process is stored in the memory 106 or 107.

When the area signal switches from 3 to 0, the slant end address is stored in the memory 1–4 or 105 with the address corresponding to area number 0. Then, the writing using area number 0 is completed. When the line synchronizing signal LSYNC is generated, the modes of the memories 102 and 103 are interchanged. When the memory 102 is operating in the write mode and the memory 103 is operating in the read mode, the memories 102 and 103 are respectively switched to the read and write modes in response to the line synchronizing signal LSYNC. The memories 104 and 105 and the memories 106 and 107 operate in the same manner as the memories 102 and 103.

That is, the slant starting address, the slant end address and the slant process information are used for read control (FIG. 10) with a delay corresponding to one line. Hence, there is no offset between the image data the area signal in the line direction (sub-scanning direction). The content of the partial addition address in the register 82 is updated every line or every lines.

Referring to FIG. 8, when the line synchronizing signal LSYNC is generated, the up/down instruction signal U/<D> is high, and therefore the down/up counter 101 functions as a down counter. Further, the outputs X and Y of the switch unit 85 are the slant starting address MSAD and the slant end address MEAD. Furthermore, the area number output by the area memory controller 108 is the initial value 0.

When the count value of the up/down counter 100 increases and becomes equal to the sum of the slant starting address MSAD and the extended addition address in the register 83 at the comparator 96 (the partial slant indication flag SHMout is high), the loading signal DLD output by the controller 99 is switched from the low level to the high level. Hence, the down/up counter 101 is switched from a state in which the slant end address MEAD is loaded to a state in which the counter 101 functions as a down counter. Simultaneously, the controller 99 switches the slant selecting signal SMSEL to the high level, and the data selecting signal output by the control unit 33 shown in FIG. 4 is switched to the high level.

The down/up counter 101 sequentially decreases its count value, while the up/down counter 100 sequentially increases its count value. At this time, the read address is the sum of the address value indicated by the up counter 100 and the partial addition address. In this manner, only the local-area-slant-designated area can be moved. An unnecessary area can be detected in the same manner as that in the in-area slant.

When the count value of the down/up counter becomes equal to the slant starting address MSAD and the partial addition address value at the comparator 95 (the local-area slant indication flag SHMout is high), the loading signal DLD is switched from the high level to the low level. Hence, the down/up counter 101 is switched to the loading state again, and the slant selecting signal SHSEL is switched to the low level. Simultaneously, the signal SHMin is switched in the order L-H-L, and the area number output by the area memory controller 108 is switched from 0 to 1. With respect to area number 1, no data is written in the data writing operation on the previous line. Thus, the signals SHMout (local-area slant indication flag) and MRMout (local-area mirror indication flag) are switched to the low level. Until the line synchronizing signal is generated, the read address is the output of the up/down counter 100.

With respect to an unnecessary area part, the data converting unit 34 outputs either the constant-color data or the averaged data in response to a selection input by the operator before the copying operation is started. In this manner, the read address is increased or decreased with respect to only the area for which the slanting mode is designated.

MOVEMENT/MIRROR/SLANT & LOCAL-AREA SLANT MODE

The operation in this mode differs from that in the local-area slant mode in the total area stored in the register 81. The operation in this mode is substantially the same as that in the local-area slant mode. Image outputs shown in FIGS. 34, 36, 39 and 41 can be obtained from the original shown in FIG. 12.

REPEAT & LOCAL-AREA SLANT MODE

Figure 65:
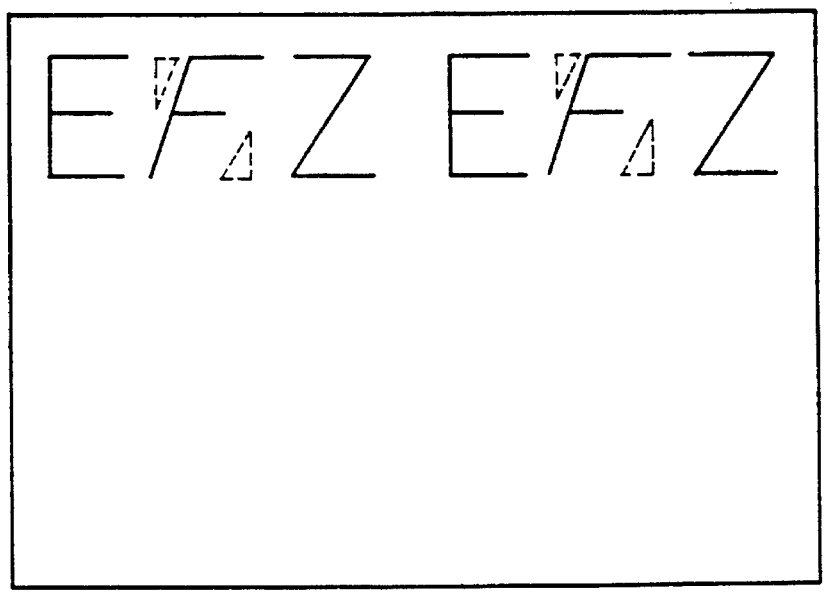
FIG. 65 is a diagram illustrating an image output derived from the original shown in FIG. 58.

The operation in this mode is substantially the same as that in the aforementioned repeat & local-area mirror mode in which the local-area slant mode is used instead of the local-area mirror mode. An image output shown in FIG. 65 can be obtained from the original shown in FIG. 58.

LOCAL-AREA MIRROR & LOCAL-AREA SLANT MODE (1) In-area slant mode

The controller 99 shown in FIG. 8 outputs the loading signal RPLD, which is the same as the line synchronizing signal LSYNC. Before address matches are obtained at the comparators 94 and 95, the controller 99 sets the mirror selecting signal MRSEL to the high level when the local-area mirror indication signal MRMout switches to the high level. In other cases, the mirror selecting signal MRSEL is low. Before address matches are obtained at the comparators 84 and 95, the controller 99 sets the slant selecting signal SHSEL to the high level when the local-area slant indication signal SHMout is high. In other cases, the slant selecting signal SHSEL is low. The controller 99 switches the loading signal DLD to the high level when either the mirror selecting signal MRSEL or the slant selecting signal SHSEL are required. When the loading signal DLD is high, the down/up counter 101 functions as an up counter. At this time, the counter 101 is released from the loading state, and functions as an up or down counter on the basis of the level of the terminal D/<U>. The signal MRMin is switched to the high level when the mirror selecting signal MRSEL switches from the high level to the low level. In other cases, the signal MRMin is low. The local-area slant indication flag SHMout output by the circuit shown in FIG. 9 is valid when it is high. The local-area mirror indication flag MRMout output by the circuit shown in FIG. 9 is valid when it is high. All signals other than above are set to the low level. When the slant selecting signal is switched to the high level, the circuit shown in FIG. 6 starts to operate, and the operation of this circuit is the same as that in the in-area slant mode.

The detailed operation in the local-area mirror & local-area slant mode is the same as that in the extended slant mode (described below), the local-area mirror and the local-area slant modes.

(2) Extended slant mode

The controller 99 shown in FIG. 8 outputs the loading signal RPLD, which is the same manner as the line synchronizing signal LSYNC. The mirror selecting signal MRSEL is high when the local-area mirror indication flag MRMout is high, the local-area slant indication flag SHMout is high before address matches are respectively obtained at the comparators 96 and 97. In other cases, the mirror selecting signal MRSEL is low. The slant selecting signal SHSEL is high when the local-area slant indication flag SHMout is high before address matches are respectively obtained at the comparators 96 and 97. In other cases, the slant selecting signal SHSEL is low. The loading signal DLD is high when either the mirror selecting signal MRSEL or the slant selecting signal SHSEL is high. At this time, the down/up counter 101 is released from the loading state, and functions as an up or down counter on the basis of the level of the terminal D/<U>. The signal MRMin is switched to the high level when the mirror selecting signal MRSEL is switched from the high level to the low level. In other cases, the signal MRMin is low. The local-area slant indication flag SHMout is the output signal of the circuit shown in FIG. 9. The slant selecting signal SHSEL is high when the local-area slant indication flag SHMout is switched to the high level before address matches are respectively obtained at the comparators 94 and 95. In other cases, the slant selecting signal SHSEL is low. When the slant selecting signal SHSEL is switched to the high level, the circuits shown in FIGS. 5 and 6 start to operate. These circuits operate in the same as those in the in-area slant mode.

Figure 23:
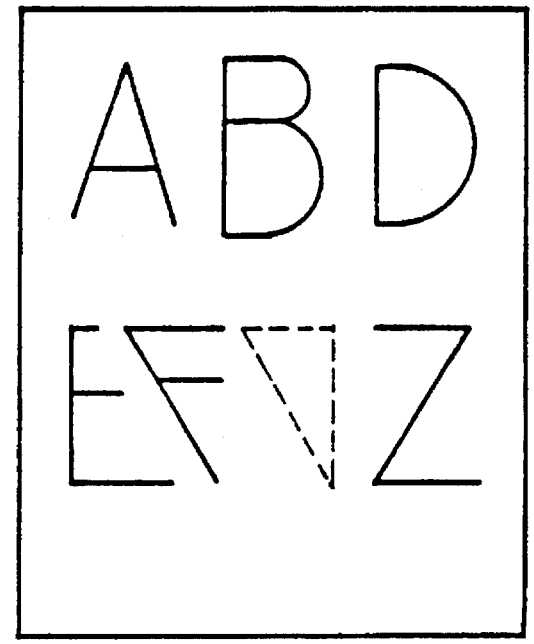
FIG. 23 is a diagram illustrating an image output obtained by image processing (local-area slant & local-area mirror) in the embodiment of the present invention.
Figure 25:
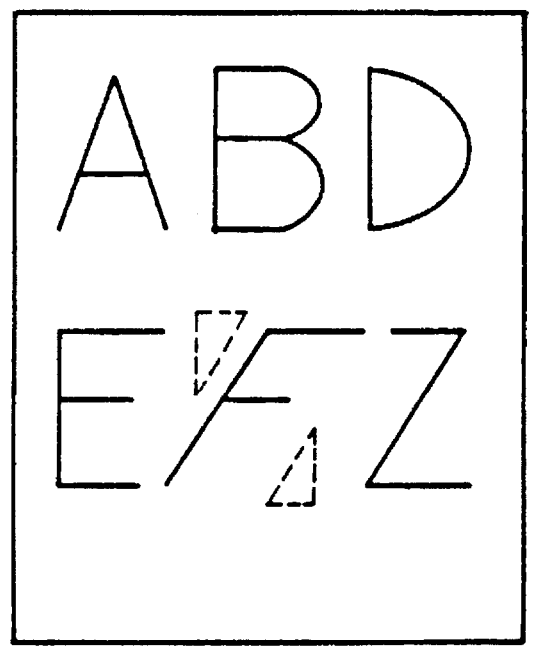
FIG. 25 is a diagram illustrating an image output obtained by image processing (local-area slant & local-area mirror) in the embodiment of the present invention.

A description will now be given of an operation in which image outputs shown in FIGS. 23 and 25 are obtained by slanting the designated area indicated by the broken line shown in FIG. 2.

The partial addition address stored in the register 82 is used to increase or decrease the total area address of the partial slant area stored in the register 81. The extended addition address stored in the register 83 has the same absolute value as that of the partial addition address in the register 82, but the sign of the extended addition address is different from that of the partial addition address.

With respect to the designated area indicated by the broken line on the original, the area signal indicates 6 (slant & mirror). With respect to the other areas, the area signal indicates 0 (normal mode). When the area signal switches from 0 to 3, the address corresponding to area number 0 is output, and the slant/mirror starting address is written into the memory 102 or 103, and simultaneously information indicating the slant/mirror process is written into the memory 106 or 107.

When the area signal switches from 6 to 0, the address corresponding to area number 0 is output, and the slant/mirror end address is stored in the memory 104 or 105. Then, the writing with respect to area number 0 is ended. When the next line synchronizing signal LSYNC is generated, the modes of the memories 102 and 103 are interchanged. When the memories 102 and 103 are operating in the write and read modes, respectively, the memories 102 and 103 are switched to the read and write modes, respectively. The memories 104 and 105 and the memories 106 and 107 operate in the same manner as the memories 102 and 103.

That is, the slant/mirror starting address, the slant/mirror end address, and the information indicating the slant/mirror mode is used to for read control (FIG. 10) with a delay equal to one line. Hence, there is no offset between the image data the area signal in the line direction (sub-scanning direction).

Referring to FIG. 8, when the line synchronizing signal LSYNC is generated, the up/down instruction signal U/<D> is low, and the down/up counter 101 functions as a down counter. Further, the switch unit 85 outputs the mirror starting address MSAD and the mirror end address MEAD via its outputs X and Y. The area number output by the area memory controller 108 is the initial value 0.

At the comparator 96, when the count value of the up/down counter increases and becomes equal to the sum of the mirror end address and the partial address in the register 82 (the local-area slant indication flag SHMout and the local-area mirror indication flag MRMout are high), the loading signal is switched from the low level to the high level, and the down/up counter 101 is switched from a state in which the slant end address MEAD is loaded to a state in which the counter 101 functions as a down counter. Further, the slant selecting signal SHSEL and the mirror selecting signal MRSEL are switched to the high level. Simultaneously, the data selecting signal is behaved in the same manner as in the case of the in-area slant.

The down/up counter 101 sequentially decreases its count value, while the up/down counter 100 sequentially increases its count value. The read address obtained at this time is the sum of the address indicated by the down counter 101 and the partial addition address. In this manner, only the local-area-slant-designated area can be moved. An unnecessary area can be detected in the same manner as that in the in-area slant.

When the count value of the down/up counter 101 becomes equal to the address MEAD and the partial address at the comparator 95 (the local-area slant indication flag SHMout and the local-area mirror indication flag MRMout are high), the loading signal DLD is switched from the high level to the low level, and the down/up counter 101 is switched to the loading state again. Simultaneously, the slant selecting signal SHSEL and the mirror selecting signal MRSEL are switched to the low level. Further, the signals SHMin and MRMin are changed in the order L-H-L, and the area number output by the area memory controller 108 is switched from 0 to 1. With respect to area number 1, no data is written on the write operation on the previous line, and the local-area slant indication flag SHMout and the local-area mirror indication flag MRMout are switched to the low level. The read address is the count value of the up/down counter 100 until the line synchronizing signal is generated.

With respect to an unnecessary area part, the data converting unit 34 outputs either the constant-color data or the averaged data in response to a selection input by the operator before the copying operation is started. In this manner, the read address is increased or decreased with respect to only the area to which the slanting mode is designated.

MOVEMENT/MIRROR/SLANT+LOCAL-AREA SLANT MIRROR MODE

The operation in this mode differs from that in the local-area slant and mirror mode in the total address stored in the register 81, and hence will be apparent from the previous description. Image outputs shown in FIGS. 37, 38 and 40 can be derived from the original shown in FIG. 12.

REPEAT & LOCAL-AREA SLANT MIRROR

This mode can be obtained by simply replacing the mirror process in the repeat & local-area mirror mode by the local-area slant mode. Referring to FIG. 8, information concerning the in-area slant mode, the extended slant mode and the slant color mode (local-area slant modes) is input to the system before starting to copy, and are not changed during copying.

The local-area mirror indication flag MRMout, the local-area slant indication flag SHMout and the repeat select flag RFLAG are controlled on the basis of the area signal, as has been described previously. The whole control is based on the local-area slant mode, and the following control process is added to the local-area slant and mirror control process. The loading signal RPLD becomes valid when the line synchronizing signal LSYNC is generated or when the repeat selecting flag RFLAG is valid and an address match is obtained a the comparator 93. The loading signal RLD is switched to the high level when the repeat selecting flag RFLAG is valid (high) and an address match is obtained at the comparator 93. In other cases, the loading signal RLD is low.

A description will now be given of a procedure for designating a plurality of areas. The operation of the circuit shown in FIG. 9 will be described with reference to FIG. 44.

No. 1; There is no local-area process and the flags MRMout and SHMout do not become valid. Hence, not process is carried out.

No. 2; The address of a line segment AS is stored in an area indicated by area number 0 as the mirror starting address MSAD, and the address of a segment SE is stored therein as the mirror end address MEAD. Data is stored from the memory from area number 0.

No. 3; The address of the line segment AS is stored in the area indicated by area number 0 as the mirror starting address MSAD, and the address of the segment SE is stored therein as the mirror end address MEAD. These addresses are mirror information. The address of a line segment BS is stored in an area specified by area number 1 as the mirror starting address MSAD, and the address of a segment is stored therein as the mirror end address MEAD. These addresses are slant information. Data is read in the order of area numbers 0 and 1 in the normal mode, and in the order of area numbers 1 and 0 in the mirror mode.

Figure 44:
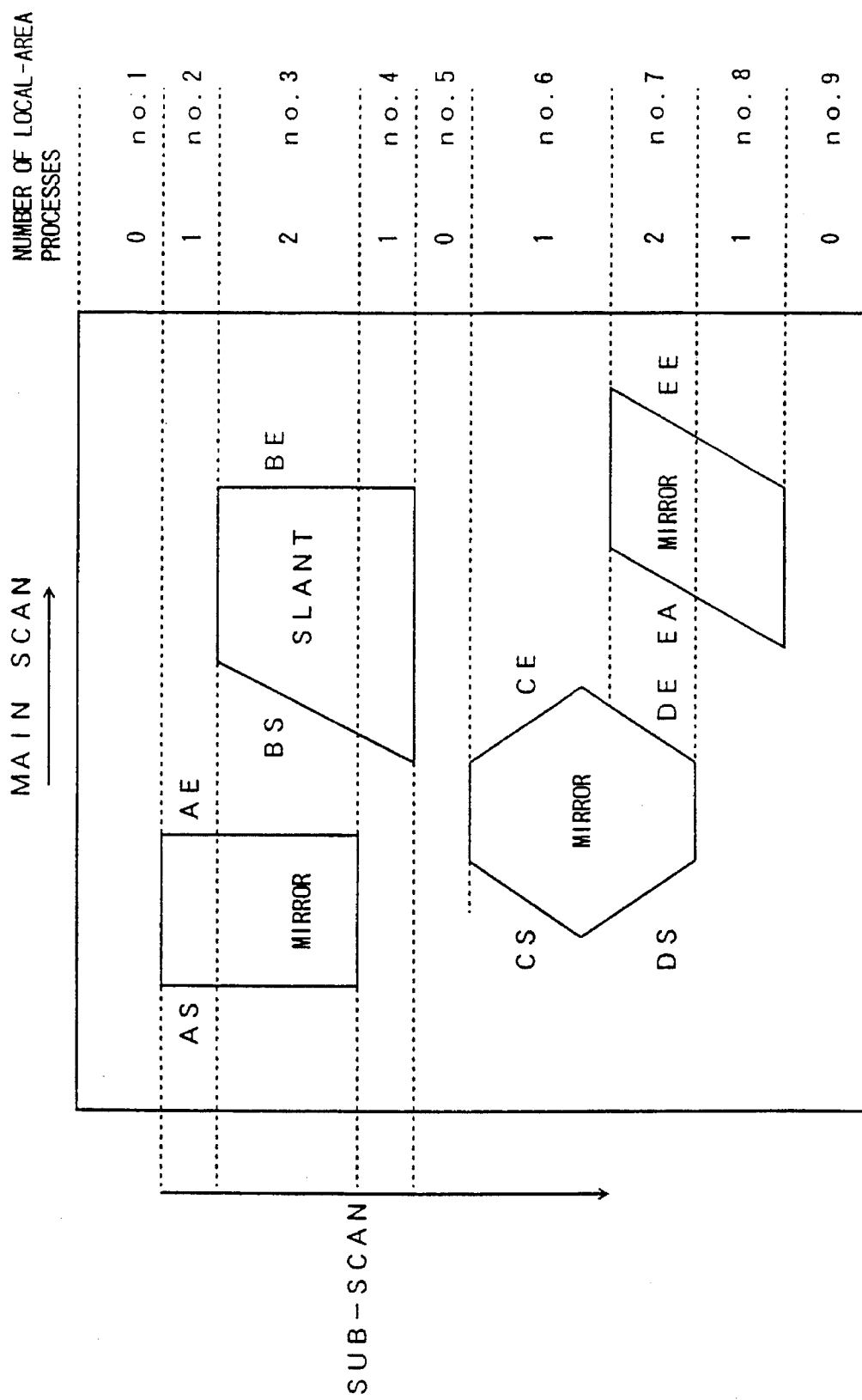
FIG. 44 is a diagram illustrating a manner to designate a plurality of areas.

In the above-mentioned manner, the images shown in FIG. 44 are processed up to No. 9.

The embodiment being considered has only one partial addition address register 82 and only one extended addition address register 83. Hence, only one partial address and only one extended addition address can be designated. It is possible to provide a plurality of registers in order to selectively designate a plurality of partial addition address values and a plurality of extended addition address values. In the embodiment, the addresses of the memories are combined and the sum of the number of processes in the local-area mirror mode and the number of processes in the local-area slant mode is managed for one copy. However, it is possible to separately manage these numbers. In this case, it is easily to process an overlapping area in which an area to be processed in the local-area mirror mode and an area to be processed in the local-area slant mode. Further, a plurality of slant areas can be easily managed. The above information can be stored in the partial addition address register 82 and the extended addition address register 83.

Figure 61:
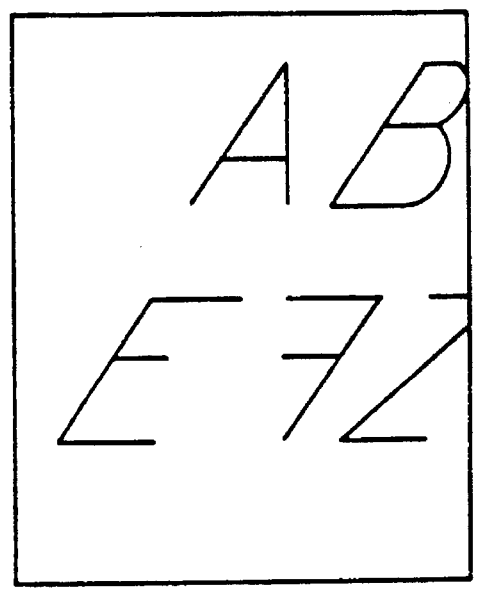
FIG. 61 is a diagram illustrating an image output derived from the original shown in FIG. 58.
Figure 62:
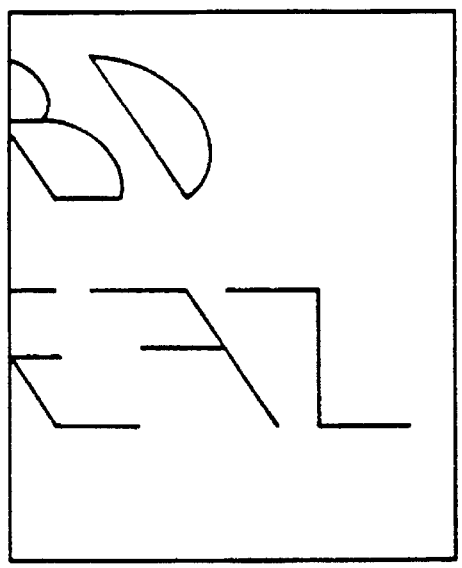
FIG. 62 is a diagram illustrating an image output derived from the original shown in FIG. 58.
Figure 63:
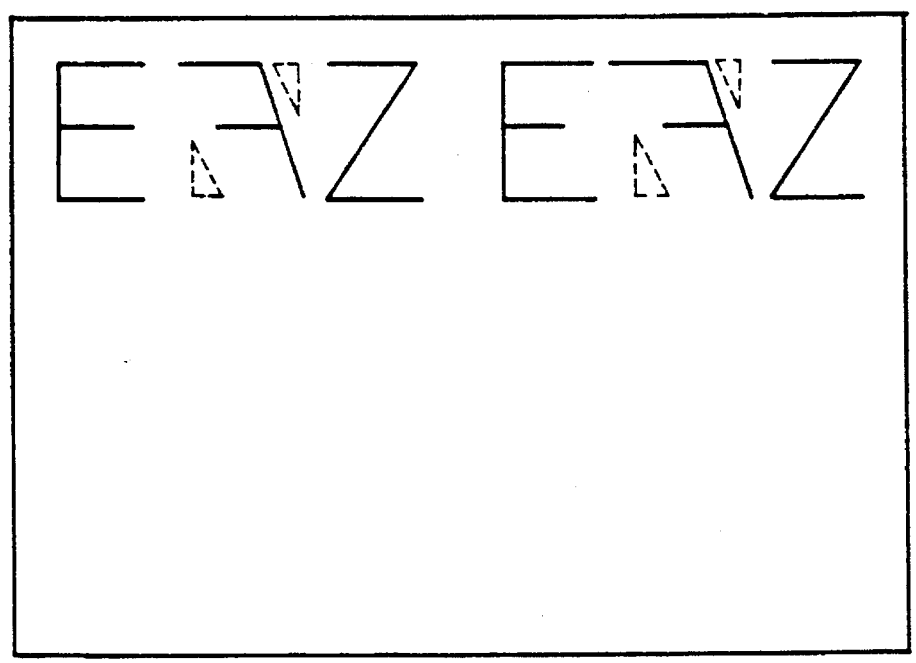
FIG. 63 is a diagram illustrating an image output derived from the original shown in FIG. 58.

Images outputs shown in FIGS. 61 through 63 can be obtained in the repeat & local-area slant mirror mode.

According to the present invention, the following advantages can be obtained. Image data can be erased before it is written into memories. The address of image data to be erased can be converted into a predetermined address when the image data is read from the memories, so that the image data can be erased.

Since image data unnecessary to be output is erased when the image data is written into the memories. Hence, an image to be repeatedly output can be arranged at equal intervals on an output document.

The repeat mode and the slant mode can be carried out by using a single memory, and hence image can be efficiently output.

The address converting process can be realized by toggle memories rather than selecting one of two outputs relating to the two lines. Further, area processing can be easily carried out.

An unnecessary area can be easily detected and a color used to print such an unnecessary area can be selected in order to output it as a background area.

It is possible to control the repeat process separately from other processes.

The present invention is not limited to the specifically disclosed embodiments, and variations and modifications may be made without departing from the scope of the present invention.

What is claimed is:

1. An image processing apparatus, comprising:
    a) image reading means for reading an original for each line in a main scanning direction and for outputting image data of the original;
    b) storage means, coupled to said image reading means, for storing the image data and white image data in an area of the storage means indicated by a given address, said storage means having a storage capacity equal to at least one line in the main scanning direction in order to store the image data;
    c) process means, coupled to said image reading means, for generating an address for modifying an image formed by the image data read by said image reading means; and
    d) control means, coupled to said storage means and to said process means, said control means including:
        1) means for specifying the address generated by said process means when the address generated by said process means falls within a range of address of said storage means; and
        2) means for specifying the given address of the storage means when the address generated by said process means falls outside the range.

2. The image processing apparatus as claimed in claim 1, further comprising designating means for designating an area on the document which is to be repeatedly output a predetermined number of times.

3. The image processing apparatus as claimed in claim 2, wherein said designating means comprises:
    first means, coupled to said control means, for specifying said predetermined number of times;
    second means, coupled to said control means, for specifying a starting address of said area to be repeatedly output; and
    third means, coupled to said control means, for specifying an end address of said area to be repeatedly output.

4. The image processing apparatus as claimed in claim 1, wherein:
    said storage means comprises first and second memories; and
    said control means comprises means for providing the write address to one of the first and second memories and the read address to other one of the first and second memories.

5. The image processing apparatus as claimed in claim 1, further comprising:
    designating means for designating an area on the document which is to be output in a slant state;
    detecting means for detecting an overlapping area in which said area designated by said designating means overlaps another area on the document when said area designated by said designating means is slanted; and
    converting means, coupled to said detecting means and said storage means, for outputting predetermined image data concerning said area designated by said designating means instead of the image data from the storage means.

6. The image processing apparatus as claimed in claim 5, wherein said predetermined image data indicates a white color.

7. The image processing apparatus as claimed in claim 1, wherein said control means comprises:
    first means for storing a reference write address and a reference read address; and
    second means for sequentially changing a count value from the reference write address or the reference read address, so that the write address or the read address is generated.

* * * * *